(12) United States Patent
Morizono et al.

(10) Patent No.: US 6,218,469 B1
(45) Date of Patent: Apr. 17, 2001

(54) UNSATURATED ELASTOMER COMPOSITIONS AND THEIR VULCANIZED RUBBERS

(75) Inventors: Kenichi Morizono; Keiji Okada; Masayoshi Yamaguchi, all of Waki-cho (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/118,379

(22) Filed: Jul. 17, 1998

(30) Foreign Application Priority Data

Jul. 18, 1997 (JP) .................................................. 9-209975
Dec. 9, 1997 (JP) .................................................. 9-338393

(51) Int. Cl.$^7$ .............................. C08L 53/00; C08L 9/00; C08L 47/00; C08L 23/04; C08L 23/00
(52) U.S. Cl. ............................ 525/88; 525/232; 525/236; 525/237; 525/240; 525/241
(58) Field of Search .................................... 525/232, 236, 525/240, 241, 237, 88

(56) References Cited

U.S. PATENT DOCUMENTS

| | | |
|---|---|---|
| 4,645,793 | 2/1987 | Von Hellens et al. . |

FOREIGN PATENT DOCUMENTS

| | | |
|---|---|---|
| 0603724 | 6/1994 | (EP) . |
| 278687 | 3/1990 | (JP) . |
| 4268307 | 9/1992 | (JP) . |
| 8143712 | 6/1996 | (JP) . |
| 98/31745 | * 7/1998 | (WO) . |

OTHER PUBLICATIONS

Makromol. Chem. 192, 2591–2601 (1991)—C NMR analysis of α–olefins copolymers with 1,3–butadiene obtained with zirconocenes/methylalumoxane . . .

Makromol. Chem. Phys., 197, 1071–1083 (1996)—Influence of polymerizatrion conditions on the copolymerization of styrene . . . Ziegler–Natta catalysts.

Macromolecules 28, 4665–4667 (1995)—Regiospecificity of Ethylene–Styrene Copolymerization with a Homogeneous Zirconocene Catalyst.

Journal of Organaometallic Chem., 228 (1985) pp. 63–67—Synthesis and Crystal Structure of a Chiral ansa–Zirconocene Derivative with . . . Ligands.

* cited by examiner

*Primary Examiner*—Patrick D. Niland

(57) ABSTRACT

Disclosed is an unsaturated elastomer composition comprising (A) an unsaturated olefin copolymer of at least one α-olefin of 2 to 20 carbon atoms, a conjugated diene monomer represented by the following formula (I), and optionally, an aromatic vinyl compound, and (B) at least one rubber selected from a diene rubber and an ethylene/α-olefin/nonconjugated polyene copolymer rubber, a weight ratio of said component (A) to said component (B) ((A)/(B)) being in the range of 1/99 to 99/1;

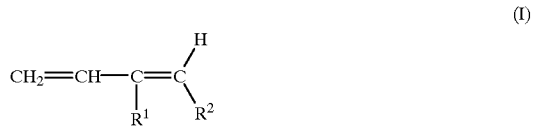

(I)

wherein $R^1$ and $R^2$ are each independently a hydrogen atom, an alkyl group of 1 to 8 carbon atoms or an aryl group, and at least one of $R^1$ and $R^2$ is a hydrogen atom. From the composition, a vulcanized product excellent in vibration damping properties, vibration insulation properties and strength properties as well as in heat resistance, weathering resistant, ozone resistance and dynamic fatigue resistance can be obtained.

56 Claims, No Drawings

UNSATURATED ELASTOMER COMPOSITIONS AND THEIR VULCANIZED RUBBERS

FIELD OF THE INVENTION

The present invention relates to unsaturated elastomer compositions and their vulcanized rubbers. More particularly, the invention relates to unsaturated elastomer compositions capable of producing vulcanized products having excellent heat resistance, weathering resistance, ozone resistance, oil resistance and low-temperature properties when blended with diene rubbers, such as NR, IR, SBR, NBR and hydrogenated NBR, or EPT, and also relates to vulcanized rubbers of the compositions.

BACKGROUND OF THE INVENTION

Examples of the diene rubbers include natural rubber (NR), isoprene rubber (IR), styrene-butadiene rubber (SBR), nitrile rubber (NBR) and hydrogenated nitrile rubber. Of the diene rubbers, the natural rubber (NR), the isoprene rubber (IR), the styrene-butadiene rubber (SBR) and the butadiene rubber (BR) have excellent processability and strength, so that they are widely used for tires, automobile parts and common industrial parts. The diene rubbers, however, have poor weathering resistance and ozone resistance, and therefore their products have a problem of short lifetime.

U.S. Pat. No. 4,645,793 discloses, as a diene rubber improved in the above properties, a blend of a diene rubber and an ethylene/α-olefin copolymer rubber. Though the blend is improved in the weathering resistance and the ozone resistance, it still has problems of insufficient strength properties, such as lower dynamic fatigue resistance (flexural fatigue resistance), lower vibration damping properties, lower vibration insulation properties, and lower adhesion strength to fibers than diene rubbers.

Japanese Patent Laid-Open Publication No. 143712/1996 describes an elastomer composition obtained by crosslinking a mixture of an ethylene/α-olefin/aromatic vinyl compound/nonconjugated diene copolymer and an elastomer. It is also described that this composition is excellent in mechanical properties such as tensile strength and abrasion resistance. However, the composition is not always sufficient in vulcanizing rate, strength properties and adhesion strength to fibers.

Of the diene rubbers mentioned above, the nitrile rubber and the hydrogenated nitrile rubber have excellent strength and oil resistance, and therefore they are widely used for sealing materials, rolls and belts. The nitrile rubber and the hydrogenated nitrile rubber, however, are poor in weathering resistance, ozone resistance, low-temperature properties and dynamic fatigue resistance, so that the lifetime of their products is short.

In "Japanese Rubber Association Bulletin 49, 236, 241, 246" (1976), a blend containing an ethylene/α-olefin copolymer rubber, which has been improved in the weathering resistance and the ozone resistance, is disclosed. Though the blend is improved in the weathering resistance and the ozone resistance, it still has problems of low dynamic fatigue resistance and low adhesion strength to fibers.

Because of excellent strength properties, heat resistance and weathering resistance, ethylene/α-olefin/polyene copolymer rubbers such as an ethylene propylene/diene copolymer are widely used for automobile parts, industrial rubber parts, electrical insulating materials, and civil engineering and building materials.

The ethylene/α-olefin/polyene copolymer rubbers, however, are poor in vibration damping properties, vibration insulation properties and dynamic fatigue resistance (flexural fatigue resistance), and therefore they have a problem of short lifetime when used for specified purposes such as rubber vibration insulators, rubber rolls, belts and tires.

Accordingly, there have been desired (1) elastomer compositions excellent in vibration damping properties, vibration insulation properties and strength properties as well as in heat resistance, weathering resistance, ozone resistance and dynamic fatigue resistance, (2) vulcanizable rubber compositions capable of producing vulcanized products not only having excellent strength properties, oil resistance, weathering resistance, ozone resistance, low-temperature properties and dynamic fatigue resistance but also having excellent adhesion to fibers when used for belts, and (3) elastomer compositions excellent in strength properties, vibration damping properties and vibration insulation properties as well as in heat resistance, weathering resistance and dynamic fatigue resistance (flexural fatigue resistance).

The present inventors have earnestly studied to obtain elastomer compositions having the above properties, and as a result, they have found that vulcanized products having the above properties can be obtained from compositions comprising an unsaturated olefin copolymer obtained by random copolymerizing ethylene, an α-olefin of 3 to 20 carbon atoms, a conjugated diene monomer, and optionally, an aromatic vinyl compound, and NR, SBR, NBR, hydrogenated NBR or EPT. Based on the finding, the present invention has been accomplished.

OBJECT OF THE INVENTION

The present invention is intended to solve such problems associated with the prior art as described above, and it is an object of the invention to provide vulcanizable unsaturated elastomer compositions having excellent heat resistance, weathering resistance, ozone resistance, oil resistance and low-temperature properties and to provide vulcanized rubbers of the compositions.

SUMMARY OF THE INVENTION

The first unsaturated elastomer composition according to the invention is a composition comprising:

(A-1) an unsaturated olefin copolymer of at least one α-olefin of 2 to 20 carbon atoms and a conjugated diene monomer represented by the following formula (I), and (B) at least one rubber selected from a diene rubber and an ethylene/α-olefin/nonconjugated polyene copolymer rubber, a weight ratio of said component (A-1) to said component (B) ((A-1)/(B)) being in the range of 1/99 to 99/1;

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

The second unsaturated elastomer composition according to the invention is a composition comprising:

(A-2) an unsaturated olefin copolymer of at least one α-olefin of 2 to 20 carbon atoms, a conjugated diene monomer represented by the above formula (I) and an aromatic vinyl compound, and (B) at least one rubber selected from a diene rubber and an ethylene/α-olefin/nonconjugated polyene copolymer rubber, a weight ratio of said component (A-2) to said component (B) ((A-2)/(B)) being in the range of 1/99 to 99/1.

As the unsaturated olefin copolymer (A-1), an unsaturated olefin copolymer of ethylene, an α-olefin of 3 to 20 carbon atoms and the conjugated diene monomer represented by the formula (I) is preferably employed.

As the unsaturated olefin copolymer (A-2), an unsaturated olefin copolymer of ethylene, an α-olefin of 3 to 20 carbon atoms, the conjugated diene monomer represented by the formula (I) and the aromatic vinyl compound is preferably employed.

As the diene rubber which is the component (B), nitrile rubber and/or hydrogenated nitrile rubber can be employed, or at least one rubber selected from the group consisting of natural rubber, isoprene rubber, styrene-butadiene rubber and butadiene rubber can be employed.

In the present invention, it is preferable that the unsaturated olefin copolymer (A-1) has a molar ratio of constituent units derived from ethylene to constituent units derived from the α-olefin of 3 to 20 carbon atoms (ethylene/α-olefin) ranging from 99/1 to 40/60 and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

In the present invention, it is preferable that the unsaturated olefin copolymer (A-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

The unsaturated olefin copolymers (A-1) and (A-2) preferably have an intrinsic viscosity (η), as measured in decalin at 135° C., of 0.1 to 10 dl/g.

The unsaturated olefin copolymers (A-1) and (A-2) preferably have an iodine value of 1 to 50.

As the conjugated diene monomer for forming the unsaturated olefin copolymers (A-1) and (A-2), 1,3-butadiene or isoprene is preferably employed.

The vulcanized rubber according to the invention is obtained by vulcaning any of the above-mentioned unsaturated elastomer composition.

The vulcanized rubber according to the invention preferably is obtained by dynamically heat treating any of the above-mentioned unsaturated elastomer compositions (thermoplastic compositions) of the invention in the presence of an organic peroxide.

DETAILED DESCRIPTION OF THE INVENTION

The unsaturated elastomer compositions according to the invention and their vulcanized rubbers are described in detail hereinafter.

The first and the second unsaturated elastomer compositions according to the invention comprise:

(A) a specific unsaturated olefin copolymer, and (B) at least one rubber selected from a diene rubber and an ethylene/α-olefin/nonconjugated polyene copolymer rubber.

These components are described below.

(A) Unsaturated Olefin Copolymer

The unsaturated olefin copolymer (A) employable in the invention includes an unsaturated olefin copolymer (A-1) and an unsaturated olefin copolymer (A-2).

The unsaturated olefin copolymer (A-1) is a copolymer of at least one α-olefin of 2 to 20 carbon atoms and a conjugated diene monomer.

The unsaturated olefin copolymer (A-2) is a copolymer of at least one α-olefin of 2 to 20 carbon atoms, a conjugated diene monomer and an aromatic vinyl compound.

There is no specific limitation on the α-olefin, as far as the α-olefin has 2 to 20 carbon atoms. The α-olefin may be straight-chain or may have a branch.

Examples of the α-olefins include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12-ethyl-1-tetradecene. Of these, preferably used are ethylene, propylene, 1-butene, 1-hexene, 1-octene and 1-decene.

These α-olefins can be used singly or in combination of two or more kinds.

The conjugated diene monomer is represented by the following formula (I):

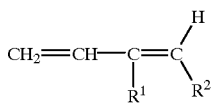

$$\text{CH}_2=\text{CH}-\underset{R^1}{C}=C\underset{R^2}{\overset{H}{\diagup}} \qquad (I)$$

wherein $R^1$ and $R^2$ are each independently a hydrogen atom, an alkyl group of 1 to 8 carbon atoms or an aryl group, and at least one of $R^1$ and $R^2$ is a hydrogen atom.

Examples of the conjugated diene monomers include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1, 3-butadiene, 2-hexyl-1,3-butadiene, 2-heptyl-1,3-butadiene, 2-octyl-1,3-butadiene and 2-phenyl-1,3 -butadiene. Of these, 1,3-butadiene and isoprene are particularly preferable because they have excellent copolymerizability. The conjugated diene monomers can be used singly or in combination of two or more kinds.

Examples of the aromatic vinyl compounds include:
styrene;
mono or polyalkylstyrenes, such as methylstyrene and ethylstyrene;
functional group-containing styrene derivatives, such as methoxystyrene, ethoxystyrene, vinylbenzoic acid, methyl vinylbenzoate, vinylbenzyl acetate, hydroxystyrene, chlorostyrene and divinylbenzene; and
phenyl-substituted alkenes, such as allylbenzene, 4-phenyl-1-butene, 3-phenyl-1-butene, 4-(4-methylphenyl)-1-butene, 4-(3-methylphenyl)-1-butene, 4-(2-methylphenyl)-1-butene, 4-(4-ethylphenyl)-1-butene, 4-(4-butylphenyl)-1-butene, 5-phenyl-1-pentene, 4-phenyl-1-pentene, 3-phenyl-1-pentene, 5-(4-methylphenyl)-1-pentene, 4-(2-methylphenyl)-1-pentene, 3-(4-methylphenyl)-1-pentene, 6-phenyl-1-hexene, 5-phenyl-1-hexene, 4-phenyl-1-hexene, 3-phenyl-1-hexene, 6-(4-methylphenyl)-1-hexene, 5-(2-methylphenyl)-1-hexene, 4-(4-methylphenyl)-1-hexene, 3-(2-methylphenyl)-1-hexene, 7-phenyl-1-heptene, 6-phenyl-1-heptene, 5-phenyl-1-heptene, 4-phenyl-1-heptene, 8-phenyl-1-octene, 7-phenyl-1-octene, 6-phenyl-1-octene, 5-phenyl-1-octene, 4-phenyl-1-octene, 3-phenyl-1-octene and 10-phenyl-1-decene.

Of the aromatic vinyl compounds, preferably used are styrene, allylbenzene and 4-phenyl-1-butene, and particularly preferably used is styrene.

These aromatic vinyl compounds can be used singly or in combination of two or more kinds.

In the unsaturated olefin copolymer (A-1), the constituent units derived from the α-olefin of 2 to 20 carbon atoms and the constituent units derived from the conjugated diene monomer are arranged at random and bonded to each other. This copolymer has double bonds derived from the conjugated diene monomer, and the main chain of the copolymer is substantially linear.

In the unsaturated olefin copolymer (A-2), the constituent units derived from the α-olefin of 2 to 20 carbon atoms, the constituent units derived from the conjugated diene monomer and the constituent units derived from the aromatic vinyl compound are arranged at random and bonded to each other. This copolymer has double bonds derived from the conjugated diene monomer, and the main chain of the copolymer is substantially linear.

The substantially gel-free linear structure of the above copolymers can be confirmed by the fact that they are dissolved in an organic solvent and substantially contain no insolubles. For example, the above structure can be confirmed by the fact that they are completely dissolved in decalin at 135° C. in the measurement of intrinsic viscosity (η).

The unsaturated olefin copolymer (A-1) for use in. the invention contains:
constituent units derived from the α-olefin of 2 to 20 carbon atoms, preferably
constituent units of 1,2-addition units (including 3,4-addition units) and 1,4-addition units derived from the conjugated diene, and more preferably
constituent units of five-membered rings (cyclopentane rings) formed in the main chain.

The unsaturated olefin copolymer (A-1) may further contain cyclopropane constituent units in addition to the above-mentioned constituent units.

The unsaturated olefin copolymer (A-2) for use in the invention contains:
constituent units derived from the α-olefin of 2 to 20 carbon atoms,
constituent units derived from the aromatic vinyl compound, preferably constituent units of 1,2-addition units (including 3,4-addition units) and 1,4-addition units derived from the conjugated diene, and more preferably
constituent units of five-membered rings (cyclopentane rings) formed in the main chain.

The unsaturated olefin copolymer (A-2) may also further contain cyclopropane constituent units in addition to the above-mentioned constituent units.

In the unsaturated olefin copolymer (A) preferably used in the invention, the molar ratio of the constituent units derived from ethylene to the constituent units derived from the α-olefin of 3 to 20 carbon atoms (ethylene/α-olefin) is in the range of 99/1 to 40/60, preferably 95/5 to 50/50, more preferably 90/10 to 55/45.

In the unsaturated olefin copolymer (A-2) preferably used in the invention, the molar ratio of the total of the constituent units derived from ethylene and the constituent units derived from the α-olefin of 3 to 20 carbon atoms to the constituent units derived from the aromatic vinyl compound (ethylene+α-olefin/aromatic vinyl compound) is in the range of 99.5/0.5 to 50/50, preferably 99/1 to 70/30, more preferably 98/2 to 80/20.

The unsaturated olefin copolymer (A) further has the following properties.

(a) In the unsaturated olefin copolymer (A), the 1,2-addition units (including 3,4-addition units) derived from the conjugated diene monomer form double bonds in the side chain of the copolymer, and the 1,4-addition units derived from the conjugated diene monomer form double bonds of cis or trans form in the main chain of the copolymer.

In the copolymer, the double bonds of the side chain derived from the 1,2-addition units (including 3,4-addition units) and the double bonds of the main chain derived from the 1,4-addition units are desirably present in such amounts that the molar ratio of the double bonds of the side chain derived from the 1,2-addition units to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, preferably 10/90 to 99/1. When the conjugated diene monomer is a conjugated diene monomer having the formula (I) wherein $R^1$ is a hydrogen atom and $R^2$ is a hydrogen atom or an alkyl group (e.g., butadiene), the above ratio is more preferably in the range of 12/88 to 90/10. When the conjugated diene monomer is a conjugated diene monomer having the formula (I) wherein $R^1$ is an alkyl group and $R^2$ is a hydrogen atom (e.g., isoprene), the above ratio is more preferably in the range of 20/80 to 90/10. If the double bonds are present in the copolymer in the above-mentioned ratio, the copolymer is improved in the weathering resistance, heat resistance, crosslinking efficiency, low-temperature resistance and modification efficiency.

(b) In the main chain of the copolymer, five-membered rings (cyclopentane rings) formed together with at least two adjacent carbon atoms of the copolymer main chain are present.

(c) In the copolymer, the double bonds from the addition units and the five-membered rings are desirably present in such amounts that the molar ratio of the double bonds from all of the addition units to the five-membered rings (total of double bonds from all kinds of addition units/five-membered rings) becomes 20/80 to 90/10, further preferably 30/70 to 80/20 in consideration of balance between the glass transition temperature Tg and the iodine value of the resulting polymer.

When the constituent units derived from the components for forming the unsaturated olefin copolymer (A) are present in the above ratio, a vulcanized product obtained from the unsaturated elastomer composition has excellent dynamic fatigue resistance and is well-balanced between the vibration damping properties, vibration insulation properties and the low-temperature properties.

The five-membered rings which may present in the unsaturated olefin copolymer (A) for use in the invention include cis form and trans form.

The mechanism of production of the five-membered ring has not been made clear yet, but it is presumed that to an oligomer chain or a prepolymer chain that is formed by the reaction of the α-olefin (e.g., ethylene) with the conjugated diene monomer (e.g., 1,3-butadiene), a conjugated diene is added through 1,2-addition or 3,4-addition reaction and then ethylene (α-olefin) is further added, followed by intramolecular cyclization, whereby a five-membered ring is produced.

The cyclopropane ring (three-membered ring) is presumed to be produced by intramolecular cyclization after 1,2-addition of the conjugated diene (e.g., butadiene) to the oligomer chain or the prepolymer chain. The five-membered ring and the cyclopropane ring are considered to contribute to improvement of compatibility of the resulting copolymer.

The production ratio by mol of the cyclopropane rings to the five-membered rings (cyclopropane ring/five-membered ring) is in the range of preferably 0.1/99.9 to 50/50, more preferably 0.1/99.9 to 30/70.

When the unsaturated olefin copolymer (A) is an ethylene/propylene/styrene/1,3-butadiene copolymer, identification of the copolymer can be made by measuring NMR using a hexachlorobutadiene solvent under the conditions of 110° C. and 100 MHz by means of a NMR measuring apparatus (manufactured by Japan Electron Optics Laboratory Co., Ltd.), and identification of the structures of the 1,4-addition unit and the five-membered ring can be made on the resulting chart by means of chemical shifts described in "Makromol. Chem." 192, 2591–2601 (1991).

Identification and quantitative determination of the following 1,2-addition unit can be made by $^1$H-NMR, $^{13}$C-NMR and two-dimensional NMR of $^1$H and $^{13}$C.

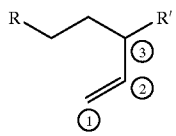

The chemical shift of each NMR is shown in Table 1.

TABLE 1

|  | 1 | 2 | 3 |
|---|---|---|---|
| Chemical shift of $^{13}$C-NMR | 110–115 ppm, | 140–145 ppm, | 40–45 ppm |
| Chemical shift of $^1$H-NMR | 4.9–5.0 ppm, | 5.2–5.9 ppm, | 1.6–2.0 ppm |

Identification and quantitative determination of the following cyclopropane ring can be made by $^{13}$C-NMR and $^1$H-NMR similarly to the above and further by a coupling constant of C—H that is inherent in the cyclopropane ring.

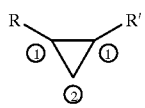

The chemical shift of each NMR is shown in Table 2.

TABLE 2

|  | 1 | 2 |
|---|---|---|
| Chemical shift of $^{13}$C-NMR | 16–22 ppm | 10–15 ppm |
| Chemical shift of $^1$H-NMR | 0.2–0.4 ppm | 0.0–0.2 ppm |
| Coupling constant ($J_{CH}$) | 154 | 156 |

Identification of styrene can be made by use of chemical shift of "Makromol. Chem. Phys." 197, 1071–1083 (1996) and "Macromolecules" 28, 4665–4667 (1995).

The ratio between the components and the quantity ratio between the structures derived from the conjugated diene can be determined by the ratio between areas of the peaks in the $^1$H-NMR and/or the $^{13}$C-NMR.

In the present invention, it is desirable that the constituent units derived from the conjugated diene monomer, namely, 1,2-addition units (including 3,4-addition units), 1,4-addition units, five-membered rings (cyclopentane structure) and cyclopropane rings (three-membered rings), are contained in the copolymer in the total amount of 0.01 to 30% by mol, preferably 0.1 to 15% by mol. The residual constituent units are constituent units derived from ethylene, an α-olefin of 3 to 20 carbon atoms and the aromatic vinyl compound such as styrene.

The unsaturated olefin copolymer (A) desirably has an intrinsic viscosity (η), as measured in decalin at 135° C., of usually 0.1 to 10 dl/g, preferably 1.0 to 7.0 dl/g. The intrinsic viscosity (η) is an indication of the molecular weight of the unsaturated olefin copolymer (A), and when the intrinsic viscosity (η) is in the above range, a vulcanized product having excellent mechanical strength and dynamic fatigue resistance can be produced from the resulting unsaturated elastomer composition.

The unsaturated olefin copolymer (A) desirably has an iodine value of usually 1 to 50, preferably 3 to 50, more preferably 5 to 40.

In the present invention, it is preferable that at least one of the molar ratio between the constituent units, the intrinsic viscosity (η) and the iodine value of the unsaturated olefin copolymer (A) is within the above range, it is more preferable that two or more of them are within the above ranges, and it is particularly preferable that all of them are within the above ranges.

The unsaturated olefin copolymer (A) has a melting point (Tm), as measured by DSC, of preferably not higher than 110° C., more preferably not higher than 70° C., still more preferably not higher than 40° C. The glass transition temperature Tg of the copolymer, as measured by DSC, is preferably not higher than 25° C., more preferably not higher than 10° C., still more preferably not higher than 0° C. The Mw/Mn value of the copolymer, as measured by GPC, is preferably not more than 3.

Preparation of Unsaturated Olefin Copolymer (A)

The unsaturated olefin copolymer (A) for use in the invention can be obtained by copolymerizing, preferably random copolymerizing the α-olefin of 2 to 20 carbon atoms, the conjugated diene monomer represented by the formula (I), and optionally, the aromatic vinyl compound, in the presence of the below-described metallocene catalyst.

The metallocene catalyst employable herein is at least one catalyst comprising a transition metal complex (a) represented by the following formula (II) or (III) and at least one compound selected from the compounds (b), (c) and (d) described below.

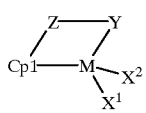
(II)

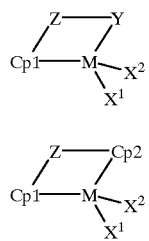
(III)

In the formulas (II) and (III), M is Ti, Zr, Hf, Rn, Nd, Sm or Ru; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is C, O, B, S, Ge, Si, Sn or a group containing any of these atoms.

The compounds (b), (c) and (d) are as follows:

(b) a compound which reacts with the transition metal M in the component (a) to form an ionic complex, (c) an organoaluminum compound, and
(d) aluminoxane.

The transition metal complex (a) for use in the invention, which is represented by the following formula (II), is described below.

(II)

wherein M is a transition metal of Group 4 or lanthanum series of the periodic table, specifically Ti, Zr, Hf, Rn, Nd, Sm or Ru, preferably Ti, Zr or Hf; Cp1 is a cyclopentadienyl group, an indenyl group, a fluorenyl group or any of their derivatives, that is π-bonded to M; $X^1$ and $X^2$ are each an anionic ligand or a neutral Lewis base ligand; Y is a ligand containing a nitrogen atom, an oxygen atom, a phosphorus atom or a sulfur atom; Z is carbon, oxygen, sulfur, boron or an element of Group 14 of the periodic table (e.g., silicon, germanium or tin), preferably carbon, oxygen or silicon, and Z may have a substituent; and Z and Y may together form a condensed ring.

In more detail, Cp1 is a ligand coordinated to the transition metal and is a ligand having cyclopentadienyl skeleton, such as a cyclopentadienyl group, an indenyl group, a fluorenyl group or any of their derivatives. The ligand having cyclopentadienyl skeleton may have a substituent, such as an alkyl group, a cycloalkyl group, a trialkylsilyl group or a halogen atom.

Z is an atom selected from C, O, B, S, Ge, Si and Sn, and may have a substituent, such as an alkyl group or an alkoxy group. The substituents of Z may be bonded to each other to form a ring.

$X^1$ and $X^2$ are each an anionic ligand or a neutral Lewis base ligand, they may be the same or different, and they are each a hydrogen atom, a halogen atom, a hydrocarbon group, a silyl group or a germyl group, having 20 or less of carbon atoms, silicon atoms, or germanium atoms.

Examples of the compounds represented by the formula (II) include:

(dimethyl(t-butylamido)(tetramethyl-$\eta^5$-cyclopentadienyl)silylene)titanium dichloride, ((t-butylamido)(tetramethyl-$\eta^5$-cyclopentadienyl)-1,2-ethanediyl)titanium dichloride, (dimethyl(phenylamido)(tetramethyl-$\eta^5$-cyclopentadienyl)silylene)titanium dichloride, (dimethyl(t-butylamido)(tetramethyl-$\eta^5$-cyclopentadienyl)silylene)titanium dimethyl, (dimethyl(4-methylphenylamido)(tetramethyl-$\eta^5$-cyclopentadienyl)silylene)titanium dichloride, (dimethyl(t-butylamido)($\eta^5$-cyclopentadienyl)silylene)titanium dichloride, and (tetramethyl(t-butylamido)(tetramethyl-$\eta^5$-cyclopentadienyl)disilylene)titanium dichloride.

Also employable in the invention is a transition metal compound represented by the following formula (III):

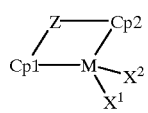
(III)

wherein M is Ti, Zr, Hf, Rn, Nd, Sm or Ru, preferably Ti, Zr or Hf; Cp1 and Cp2 are each a cyclopentadienyl group, an indenyl group, a fluorenyl group or any of their derivatives, that is π-bonded to M; $X^1$ and $X^2$ are each an anionic ligand or a neutral Lewis base ligand; and Z is C, O, B, S, Ge, Si, Sn or a group containing any of these atoms.

In the formula (III), the bonding group Z is preferably one atom selected from C, O, B, S, Ge, Si and Sn, and this atom may have a substituent, such as an alkyl group or an alkoxy group. The substituents of Z may be bonded to each other to form a ring.

Cp1 and Cp2 are each a ligand coordinated to the transition metal and are each a ligand having cyclopentadienyl skeleton, such as a cyclopentadienyl group, an indenyl group, a 4,5,6,7-tetrahydroindenyl group or a fluorenyl group. The ligand having cyclopentadienyl skeleton may have a substituent, such as an alkyl group, a cycloalkyl group, a trialkylsilyl group or a halogen atom.

$X^1$ and $X^2$ are each an anionic ligand or a neutral Lewis base ligand, specifically, an alkoxy group, an aryloxy group or a hydrocarbon group of 1 to 12 carbon atoms, a sulfonic acid-containing group ($-SO_3Ra$ wherein Ra is an alkyl group, an alkyl group substituted with a halogen atom, an aryl group, an aryl group substituted with a halogen atom, or an aryl group substituted with an alkyl group), a halogen atom or a hydrogen atom.

Examples of the metallocene compounds containing zirconium as M and containing two ligands having cyclopentadienyl skeleton include:

cyclohexylidene-bis(indenyl)dimethylzirconium,
cyclohexylidene-bis(indenyl)zirconium dichloride,
isopropylidene-bis(indenyl)zirconium dichloride,
isopropylidene(cyclopentadienyl-fluorenyl)zirconium dichloride,
diphenylsilylene-bis(indenyl)zirconium dichloride,
methylphenylsilylene-bis(indenyl)zirconium dichloride,
rac-dimethylsilylene-bis(2-methyl-1-indenyl)zirconium dichloride,
rac-dimethylsilylene-bis(4,7-dimethyl-1-indenyl) zirconium dichloride,
rac-dimethylsilylene-bis(2,4,7-trimethyl-1-indenyl) zirconium dichloride,
rac-dimethylsilylene-bis(2,4,6-trimethyl-1-indenyl) zirconium dichloride,
rac-dimethylsilylene-bis(4-phenyl-1-indenyl)zirconium dichloride,
rac-dimethylsilylene-bis(2-methyl-4-phenyl-1-indenyl) zirconium dichloride,
rac-dimethylsilylene-bis(2-methyl-4-(α-naphthyl)-1-indenyl)zirconium dichloride,
rac-dimethylsilylene-bis(2-methyl-4-(β-naphthyl)-1-indenyl)zirconium dichloride, and
rac-dimethylsilylene-bis(2-methyl-4-(1-anthryl)-1-indenyl)zirconium dichloride.

There can be also exemplified metallocene compounds wherein zirconium is replaced with titanium or hafnium in the above compounds.

Further, a bridge type transition metal compound (metallocene compound) represented by the following formula (A) is also employable.

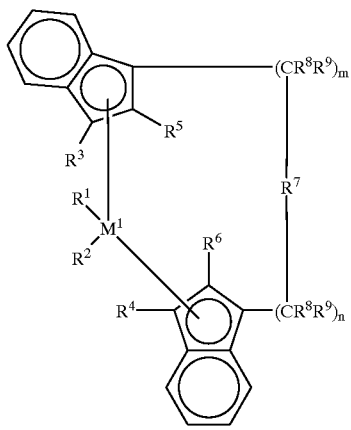
(A)

In the formula (A), $M^1$ is a metal of Group IVB of the periodic table, e.g., titanium, zirconium or hafnium.

$R^1$ and $R^2$ may be the same or different, and are each hydrogen, an alkyl group of 1 to 10, preferably 1 to 3 carbon atoms, an alkoxy group of 1 to 10, preferably 1 to 3 carbon atoms, an aryl group of 6 to 10, preferably 6 to 8 carbon atoms, an aryloxy group of 6 to 10, preferably 6 to 8 carbon atoms, an alkenyl group of 2 to 10, preferably 2 to 4 carbon atoms, an arylalkyl group of 7 to 40, preferably 7 to 10 carbon atoms, an alkylaryl group of 7 to 40, preferably 7 to 12 carbon atoms, an arylalkenyl group of 8 to 40, preferably 8 to 12 carbon atoms, or a halogen atom, preferably chlorine.

$R^3$ and $R^4$ may be the same or different, and are each hydrogen, a halogen atom, preferably fluorine, chlorine or bromine, an alkyl group of 1 to 10, preferably 1 to 4 carbon atoms which may be halogenated, an aryl group of 6 to 10, preferably 6 to 8 carbon atoms which may be halogenated, or a group of $-NR^{10}{}_2$, $-SR^{10}$, $-OSiR^{10}{}_3$, $-SiR^{10}{}_3$ or $-PR^{10}{}_2$, where $R^{10}$ is a halogen atom, preferably chlorine, an alkyl group of 1 to 10, preferably 1 to 3 carbon atoms, or an aryl group of 6 to 10, preferably 6 to 8 carbon atoms.

$R^3$ and $R^4$ are each particularly preferably hydrogen.

$R^5$ and $R^6$ may be the same or different, preferably the same, and are the same as described for $R^3$ and $R^4$ except that each of $R^5$ and $R^6$ is not hydrogen. $R^5$ and $R^6$ are each preferably an alkyl group of 1 to 4 carbon atoms which may be halogenated, for example, methyl, ethyl, propyl, isopropyl, butyl, isobutyl or trifluoromethyl, preferably methyl.

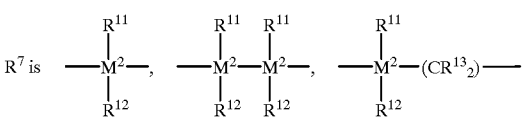

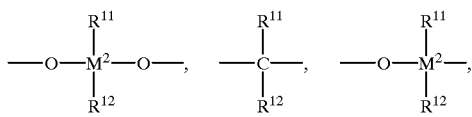

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, where $R^{11}$, $R^{12}$ and $R^{13}$ may be the same or different, and are each hydrogen, a halogen atom, an alkyl group of 1 to 10, preferably 1 to 4 carbon atoms, more preferably methyl, a fluoroalkyl group of 1 to 10 carbon atoms, preferably $CF_3$, an aryl group of 6 to 10, preferably 6 to 8 carbon atoms, a fluoroaryl group of 6 to 10 carbon atoms, preferably pentafluorophenyl, an alkoxy group of 1 to 10, preferably 1 to 4 carbon atoms, particularly preferably methoxy, an alkenyl group of 2 to 10, preferably 2 to 4 carbon atoms, an arylalkyl group of 7 to 40, preferably 7 to 10 carbon atoms, an arylalkenyl group of 8 to 40, preferably 8 to 12 carbon atoms, or an alkylaryl group of 7 to 40, preferably 7 to 12 carbon atoms, or $R^{11}$ and $R^{12}$, or $R^{11}$ and $R^{13}$ may form a ring together with the atoms to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different, and are the same as described for $R^{11}$.

m and n may be the same or different, and are each 0, 1 or 2, preferably 0 or 1, and m+n is 0, 1 or 2, preferably 0 or 1.

Particularly preferred metallocene compounds satisfying the above conditions are compounds represented by the following formulas (i) to (iii).

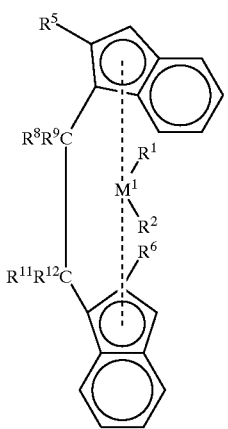

(i)

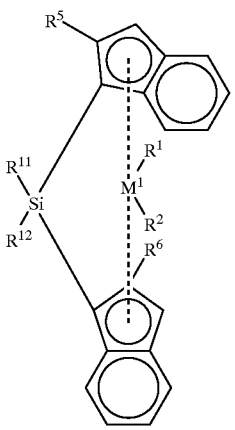

(ii)

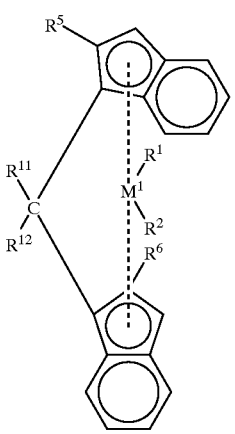

(iii)

In the above formulas (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{11}$ and $R^{12}$ are the same as each described above.

Of the compounds represented by the formulas (i), (ii) and (iii), particularly preferred are the following compounds:
rac-dimethylmethylene-bis(indenyl)zirconium dichloride,
rac-dimethylmethylene-bis(2-methyl-1-indenyl) zirconium dichloride,
rac-diphenylmethylene-bis(2-methyl-1-indenyl) zirconium dichloride,
rac-ethylene(2-methyl-1-indenyl)$_2$zirconium dichloride,
rac-dimethylsilylene(2-methyl-1-indenyl)$_2$zirconium dichloride,
rac-dimethylsilylene(2-methyl-1-indenyl)$_2$zirconium dimethyl,
rac-ethylene(2-methyl-1-indenyl)$_2$zirconium dimethyl,
rac-phenyl(methyl)silylene(2-methyl-1-indenyl) $_2$zirconium dichloride,
rac-diphenyl-silylene(2-methyl-1-indenyl)$_2$zirconium dichloride,
rac-methylethylene(2-methyl-1-indenyl)$_2$zirconium dichloride, and
rac-dimethylsilylene(2-ethyl-1-indenyl)$_2$zirconium dichloride.

These metallocene compounds can be prepared by conventionally known processes (see, for example, Japanese Patent Laid-Open Publication No. 268307/1992, corresponding to EP 485822).

In the present invention, a bridge type transition metal compound (metallocene compound) represented by the following formula (B) is also employable.

(B)

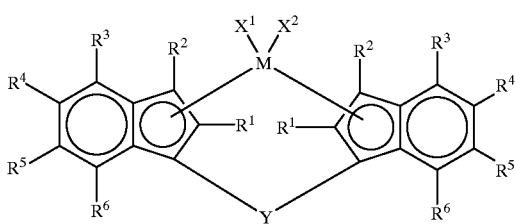

In the formula (B), M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include the above-exemplified hydrocarbon groups which are substituted with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsililphenyl.

Examples of the oxygen-containing groups include hydroxy groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing group.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms (methyl, ethyl or propyl). $R^2$ is preferably hydrogen or a hydrocarbon group, particularly preferably hydrogen or a hydrocarbon group of 1 to 3 carbon atoms (methyl, ethyl or propyl).

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, preferred is hydrogen, the hydrocarbon group or the halogenated hydrocarbon group. At least one combination of $R^3$ and $R^4$, $R^4$ and $R^5$, or $R^5$ and $R^6$ may form a monocyclic aromatic ring together with the carbon atoms to which they are bonded.

When there are two or more hydrocarbon groups or halogenated hydrocarbon groups, excluding the groups for forming the aromatic ring, they may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are those described for $R^1$ and $R^2$.

As the ligand which contains a monocyclic aromatic ring formed by at least one combination of $R^3$ and $R^4$, $R^4$ and $R^5$, or $R^5$ and $R^6$, as mentioned above, and is coordinated to M, there can be mentioned the following ones.

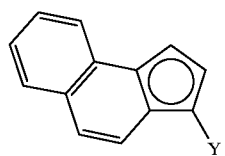

(1)

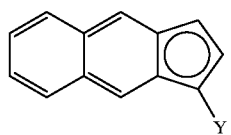

(2)

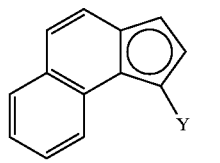

(3)

Of these, preferred is the ligand represented by the formula (1).

The aromatic ring mentioned above may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substituting the aromatic ring are those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are those described for $R^1$ and $R^2$.

Examples of the sulfur-containing groups include those described for $R^1$ and $R^2$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$—, where R$^7$ is hydrogen, a halogen atom, a hydrocarbon group of 1 to 20 carbon atoms or a halogenated hydrocarbon group of 1 to 20 carbon atoms.

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

Examples of the divalent halogenated hydrocarbon groups include the above-mentioned divalent hydrocarbon groups of 1 to 20 carbon atoms, which are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl) silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-mentioned divalent silicon-containing groups.

Examples of the divalent tin-containing groups include those wherein silicon is replaced with tin in the above-mentioned divalent silicon-containing groups.

R$^7$ is a halogen atom, a hydrocarbon group of 1 to 20 carbon atoms or a halogenated hydrocarbon group of 1 to 20 carbon atoms, examples of which are those described for R$^1$ and R$^2$.

Of the above groups, preferred are divalent silicon-containing groups, divalent germanium-containing groups and divalent tin-containing group, and more preferred are divalent silicon-containing groups. Of these, particularly preferred are alkylsilylene, alkylarylsilylene and arylsilylene.

Listed below are examples of the transition metal compounds represented by the formula (B).

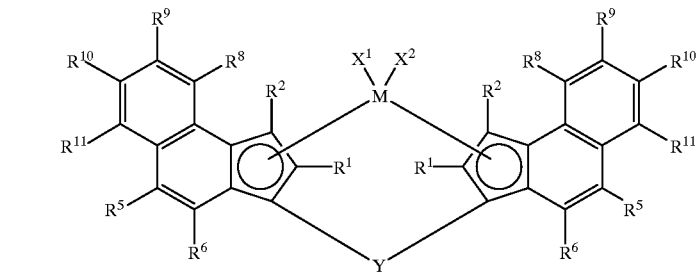

| R$^1$ | R$^2$ | R$^5$ | R$^6$ | R$^8$ | R$^9$ | R$^{10}$ | R$^{11}$ | Y | X$^1$ | X$^2$ | M |
|---|---|---|---|---|---|---|---|---|---|---|---|
| H | H | H | H | H | H | H | H | SiMe$_2$ | Cl | Cl | Zr |
| CH$_3$ | H | H | H | H | H | H | H | SiMe$_2$ | Cl | Cl | Zr |
| CH$_3$ | H | H | H | H | H | H | H | SiMePh | Cl | Cl | Zr |
| CH$_3$ | H | H | H | H | H | H | H | SiPh$_2$ | Cl | Cl | Zr |
| CH$_3$ | H | H | H | H | H | H | H | Si(p-tolyl)$_2$ | Cl | Cl | Zr |
| CH$_3$ | H | H | H | H | H | H | H | Si(pClPh)$_2$ | Cl | Cl | Zr |
| CH$_3$ | H | H | H | H | H | H | H | C$_2$H$_5$ | Cl | Cl | Zr |
| CH$_3$ | H | H | H | H | H | H | H | GeMe$_2$ | Cl | Cl | Zr |
| CH$_3$ | H | H | H | H | H | H | H | SnMe$_2$ | Cl | Cl | Zr |
| CH$_3$ | H | H | H | H | H | H | H | SiMe$_2$ | Br | Br | Zr |
| CH$_3$ | H | H | H | H | H | H | H | SiMe$_2$ | Cl | OSO$_2$CH$_3$ | Zr |
| CH$_3$ | H | H | H | H | H | H | H | SiMe$_2$ | Cl | SO$_2$CH$_3$ | Zr |
| CH$_3$ | H | H | H | H | H | H | H | SiMe$_2$ | Cl | Cl | Ti |
| CH$_3$ | H | H | H | H | H | H | H | SiMe$_2$ | Cl | Cl | Hf |
| C$_2$H$_5$ | H | H | H | H | H | H | H | SiMe$_2$ | Cl | Cl | Zr |
| nC$_3$H$_7$ | H | H | H | H | H | H | H | SiMe$_2$ | Cl | Cl | Zr |
| Ph | H | H | H | H | H | H | H | SiMe$_2$ | Cl | Cl | Zr |
| CH$_3$ | CH$_3$ | H | H | H | H | H | H | SiMe$_2$ | Cl | Cl | Zr |
| CH$_3$ | CH$_3$ | H | H | H | H | H | H | SiPh$_2$ | Cl | Cl | Zr |
| CH$_3$ | CH$_3$ | CH$_3$ | H | H | H | H | H | SiMe$_2$ | Cl | Cl | Zr |
| CH$_3$ | H | Cl | H | H | H | H | H | SiMe$_2$ | Cl | Cl | Zr |
| CH$_3$ | H | CH$_3$ | H | H | H | H | H | SiMe$_2$ | Cl | Cl | Zr |
| CH$_3$ | H | C$_2$H$_5$ | H | H | H | H | H | SiMe$_2$ | Cl | Cl | Zr |
| CH$_3$ | H | Ph | H | H | H | H | H | SiMe$_2$ | Cl | Cl | Zr |
| CH$_3$ | H | H | CH$_3$ | H | H | H | H | SiMe$_2$ | Cl | Cl | Zr |
| CH$_3$ | H | CH$_3$ | CH$_3$ | H | H | H | H | SiMe$_2$ | Cl | Cl | Zr |
| CH$_3$ | H | CH$_2$*$^1$ | CH$_3$ | H | H | H | CH$_2$*$^1$ | SiMe$_2$ | Cl | Cl | Zr |
| CH$_3$ | H | H | H | H | H | H | Ph | SiMe$_2$ | Cl | Cl | Zr |

-continued

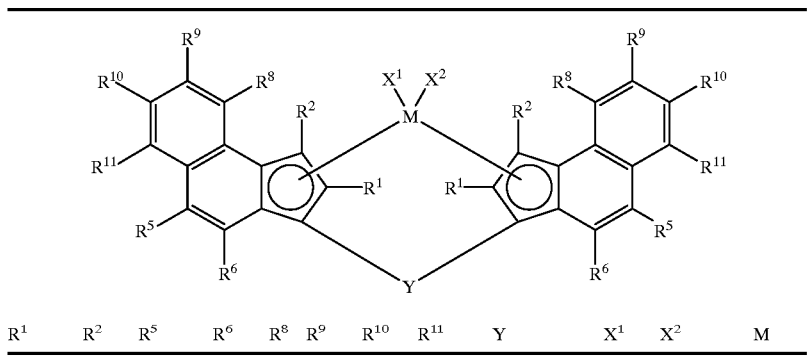

| R¹ | R² | R⁵ | R⁶ | R⁸ | R⁹ | R¹⁰ | R¹¹ | Y | X¹ | X² | M |
|---|---|---|---|---|---|---|---|---|---|---|---|

*¹R⁵ and R¹¹ are bonded to each other to form a five-membered ring.
Me: methyl; Et: ethyl; Ph: phenyl.

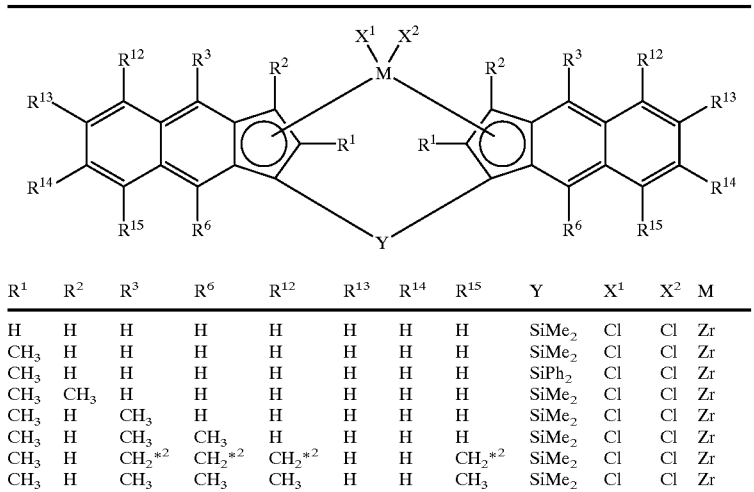

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²R³ and R¹², and R⁶ and R¹⁵ are bonded to each other to form a five-memebered ring, respectively.
Me: methyl; Ph: phenyl

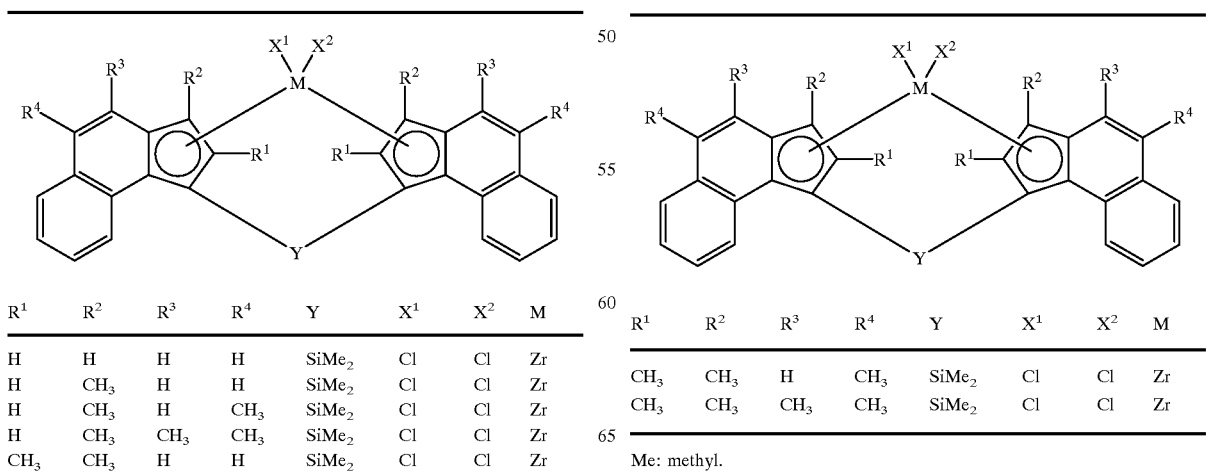

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |

| R¹ | R² | R³ | R⁴ | Y | X¹ | X² | M |
|---|---|---|---|---|---|---|---|
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

The transition metal compounds mentioned above are used generally in the form of racemic modification as the olefin polymerization catalyst component, but they can be used also in the form of R type or S type.

The indene derivative ligands for the transition metal compounds can be synthesized in accordance with ordinary organic synthesis through, for example, the reaction route described below.

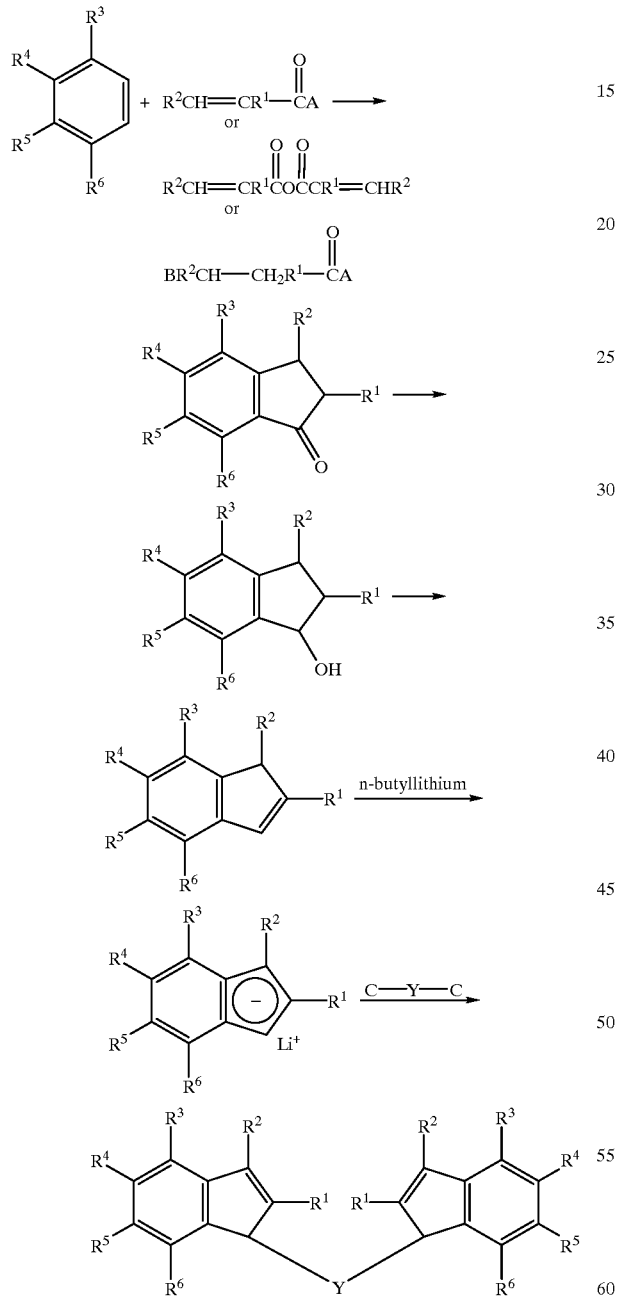

wherein A, B, C are each halogen.

The transition metal compounds used in the invention can be synthesized from these indene derivatives in accordance with conventionally known processes, for example, described in Japanese Patent Laid-Open Publication No. 268307/1992 (corresponding to EP 485822).

In the present invention, a bridge type transition metal compound (metallocene compound) represented by the following formula (C) is also employable.

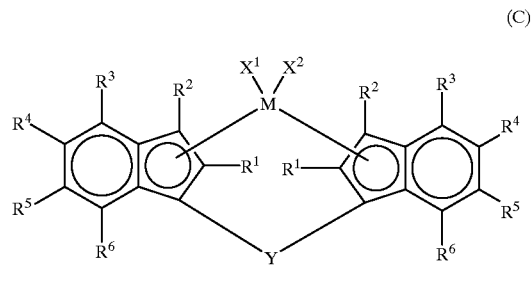

In the formula (C), M, $R^1$, $R^2$, $R^3$, $R^4$, $R^5$ and $R^6$ are the same as described for those in the aforesaid formula (B).

Of $R^3$, $R^4$, $R^5$ and $R^6$, at least two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and may be substituted with halogen atoms or silicon-containing groups. As the halogen atoms and the silicon-containing groups, there can be mentioned those substituents as described for $R^1$ and $R^2$.

Of the groups $R^3$, $R^4$, $R^5$ and $R^6$, other groups than the alkyl groups are each preferably hydrogen.

Examples of the hydrocarbon groups of 1 to 20 carbon atoms include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are those described for $R^1$ and $R^2$.

$X^1$, $X^2$, Y and $R^7$ are the same as described for those in the aforesaid formula (B).

Listed below are examples of the metallocene compounds (transition metal compounds) represented by the formula (C).

rac-Dimethylsilylene-bis(4,7-dimethyl-1-indenyl) zirconium dichloride, rac-Dimethylsilylene-bis(2,4,7-trimethyl-1-indenyl) zirconium dichloride, rac-Dimethylsilylene-bis(2,4,6-trimethyl-1-indenyl) zirconium dichloride, rac-Dimethylsilylene-bis(2,5,6-trimethyl-1-indenyl) zirconium dichloride, rac-Dimethylsilylene-bis(2,4,5,6-tetramethyl-1-indenyl) zirconium dichloride, rac-Dimethylsilylene-bis(2,4,5,6,7-pentamethyl-1-indenyl)zirconium dichloride, rac-Dimethylsilylene-bis(2-methyl-4-n-propyl-7-methyl-1-indenyl)zirconium dichloride, rac-Dimethylsilylene-bis(4-i-propyl-7-methyl-1-indenyl) zirconium dichloride, rac-Dimethylsilylene-bis(2-methyl-4-i-propyl-7-methyl-1-indenyl)zirconium dichloride, rac-Dimethylsilylene-bis(2-methyl-4-i-propyl-6-methyl-1-indenyl)zirconium dichloride, rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilylene-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4,6-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium metal or hafnium metal in the above-mentioned compounds.

The transition metal compounds mentioned above are used generally in the form of racemic modification, but they can be used also in the form of R type or S type.

The indene derivative ligands for the transition metal compounds can be synthesized in accordance with ordinary organic synthesis through, for example, the aforementioned reaction route.

The transition metal compounds (metallocene compounds) represented by the formula (C) can be synthesized from these indene derivatives in accordance with conventionally known processes, for example, described in Japanese Patent Laid-Open Publication No. 268307/1992.

In the present invention, a bridge type transition metal compound (metallocene compound) represented by the following formula (D) is also employable.

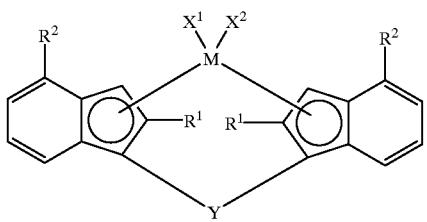

(D)

In the formula (D), M, $R^1$, $X^1$, $X^2$ and Y are the same as described for those in the aforesaid formula (B) or (C).

$R^1$ is preferably a hydrocarbon group, more preferably a hydrocarbon group of 1 to 4 carbon atoms, e.g., methyl, ethyl, propyl and butyl.

$X^1$ and $X^2$ are each preferably a halogen atom or a hydrocarbon group of 1 to 20 carbon atoms.

$R^2$ is an aryl group of 6 to 16 carbon atoms, for example, phenyl, α-naphthyl, β-naphthyl, anthracenyl, phenanthryl, pyrenyl, acenaphthyl, phenalenyl (perinaphthenyl) or aceanthrylenyl. Of these, phenyl or naphthyl is preferred. These aryl groups may be substituted with halogen atoms, hydrocarbon groups of 1 to 20 carbon atoms or halogenated hydrocarbon groups of 1 to 20 carbon atoms such as described for $R^1$.

Listed below are examples of the transition metal compounds (metallocene compounds) represented by the formula (D).

rac-Dimethylsilylene-bis(4-phenyl-1-indenyl)zirconium dichloride,
rac-Dimethylsilylene-bis(2-methyl-4-phenyl-1-indenyl)zirconium dichloride,
rac-Dimethylsilylene-bis(2-methyl-4-(α-naphthyl)-1-indenyl)zirconium dichloride,
rac-Dimethylsilylene-bis(2-methyl-4-(β-naphthyl)-1-indenyl)zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride, rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(o-chlorophenyl)-1-indenyl)zirconium dichloride,
rac-Dimethylsilylene-bis(2-methyl-4-(o,p-dichlorophenyl)phenyl-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl)zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl)zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylphenyl)-1-indenyl)zirconium dichloride,
rac-Dimethylsilylene-bis(2-methyl-4-(m-trimethylsilylphenyl)-1-indenyl)zirconium dichloride,
rac-Dimethylsilylene-bis(2-ethyl-4-phenyl-1-indenyl)zirconium dichloride,
rac-Diphenylsilylene-bis(2-ethyl-4-phenyl-1-indenyl)zirconium dichloride,
rac-Dimethylsilylene-bis(2-phenyl-4-phenyl-1-indenyl)zirconium dichloride,
rac-Dimethylsilylene-bis(2-n-propyl-4-phenyl-1-indenyl)zirconium dichloride,
rac-Diethylsilylene-bis(2-methyl-4-phenyl-1-indenyl)zirconium dichloride,
rac-Di-(i-propyl)silylene-bis(2-methyl-4-phenyl-1-indenyl)zirconium dichloride,
rac-Di-(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl)zirconium dichloride,
rac-Di(p-tolyl)silylene-bis(2-methyl-4-phenyl-1-indenyl)zirconium dichloride,
rac-Di(p-chlorophenyl)silylene-bis(2-methyl-4-phenyl-1-indenyl)zirconium dichloride,
rac-Methylene-bis(2-methyl-4-phenyl-1-indenyl)zirconium dichloride,
rac-Ethylene-bis(2-methyl-4-phenyl-1-indenyl)zirconium dichloride,
rac-Dimethylgermylene-bis(2-methyl-4-phenyl-1-indenyl)zirconium dichloride,
rac-Dimethylstannylene-bis(2-methyl-4-phenyl-1-indenyl)zirconium dichloride,
rac-Dimethylsilylene-bis(2-methyl-4-phenyl-1-indenyl)zirconium dibromide,
rac-Dimethylsilylene-bis(2-methyl-4-phenyl-1-indenyl)zirconium dimethyl,
rac-Dimethylsilylene-bis(2-methyl-4-phenyl-1-indenyl)zirconium methylchloride,
rac-Dimethylsilylene-bis(2-methyl-4-phenyl-1-indenyl)zirconium chloride $SO_2Me$, and
rac-Dimethylsilylene-bis(2-methyl-4-phenyl-1-indenyl)zirconium chloride $OSO_2Me$.

Also employable in the invention are transition metal compounds wherein zirconium is replaced with titanium metal or hafnium metal in the above-mentioned compounds.

The transition metal compounds represented by the formula (D) can be prepared in accordance with "Journal of Organometallic Chem.", 288(1985), pp. 63–67, and European Patent Publication No. 0,320,762 (specification and examples), for example, in the following manner.

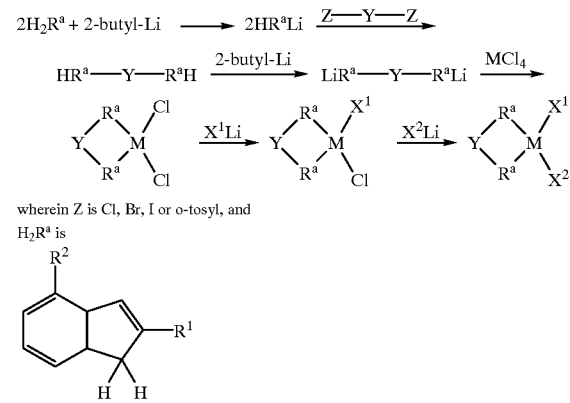

wherein Z is Cl, Br, I or o-tosyl, and $H_2R^a$ is

The transition metal compounds (D) are used generally in the form of racemic modification, but they can be used also in the form of R type or S type.

The metallocene compounds mentioned above can be used singly or in combination of two or more kinds.

The metallocene compounds can be used by supporting them on particulate carriers.

Examples of the particulate carriers include inorganic carriers, such as $SiO_2$, $Al_2O_3$, $B_2O_3$, $MgO$, $ZrO_2$, $CaO$, $TiO_2$, $ZnO$, $SnO_2$, $BaO$ and $ThO$; organic carriers, such as polyethylene, polypropylene, poly-1-butene, poly-4-methyl-1-pentene and styrene/divinylbenzene copolymer. These particulate carriers can be used singly or in combination of two or more kinds.

Next, the following compounds (b), (c) and (d) for forming the metallocene compounds are described:

(b) a compound which reacts with the transition metal M in the component (a) to form an ionic complex, namely, ionizing ionic compound, (c) an organoaluminum compound, and (d) aluminoxane (aluminum oxy-compound).

(b) Ionizing Ionic Compound

The ionizing ionic compound is a compound which reacts with the transition metal M in the transition metal complex component (a) to form an ionic complex, and examples of the ionizing ionic compounds include Lewis acid, ionic compounds, borane compounds and carborane compounds.

The Lewis acid is, for example, a compound represented by the formula $BR_3$ (R is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron and tris(3,5-dimethylphenyl)boron.

Examples of the ionic compounds include trialkyl-substituted ammonium salts, N,N-dialkylanilinium salts, dialkylammonium salts and triarylphosphonium salts. Particular examples of the trialkyl-substituted ammonium salts include triethylammoniumtetra(phenyl)boron, tripropylalmoniumtetra(phenyl)boron and tri(n-butyl) ammoniumtetra(phenyl)boron. Particular examples of the dialkylammonium salts include di(1-propyl)ammoniumtetra (pentafluorophenyl)boron and dicyclohexylammoniumtetra (phenyl)boron. Further, triphenylcarbeniumtetrakis (pentafluorophenyl)borate, N,N-dimethylaniliniumtetrakis (pentafluorophenyl)borate and ferroceniumtetra (pentafluorophenyl)borate are also available as the ionic compounds.

Examples of the borane compounds include decaborane (14), bis[tri(n-butyl)ammonium]nonaborate, bis[tri(n-butyl) ammonium]decaborate, and salts of metallic borane anions such as bis[tri(n-butyl)ammonium]-bis (dodecahydrididododecaborate)nickelate(III).

Examples of the carborane compounds include 4-carbanonaborane(14), 1,3-dicarbanonaborane(13), and salts of metallic carborane anions such as bis[tri(n-butyl) ammonium]bis(undecahydrido-7-carbaundecaborate) nickelate(IV).

The ionizing ionic compounds mentioned above can be used singly or in combination of two or more kinds.

The organoaluminum oxy-compounds and the ionizing ionic compounds can be used by supporting them on the aforesaid particulate carriers.

In the preparation of the catalyst, the below-described organoaluminum compound (c) may be used together with the organoaluminum oxy-compound and/or the ionizing ionic compound.

(c) Organoaluminum Compound

As the organoaluminum compound (c), a compound having at least one Al-carbon bond in the molecule is employable. The compound (c) is, for example, an organoaluminum compound represented by the following formula:

$$(R^1)_m Al(O(R^2))_n H_p X_q$$

wherein $R^1$ and $R^2$ may be the same or different and are each a hydrocarbon group of usually 1 to 15 carbon atoms, preferably 1 to 4 carbon atoms; X is a halogen atom; and m, n, p and q are numbers satisfying the conditions of $0<m\leq3$, $0\leq n<3$, $0\leq p<3$, $0\leq q<3$ and $m+n+p+q=3$.

(d) Organoaluminum Oxy-Compound (Aluminoxane)

The organoaluminum oxy-compound (d) may be conventional aluminoxane or such a benzene-insoluble organoaluminum oxy-compound as exemplified in Japanese Patent Laid-Open Publication No. 78687/1990.

The conventional aluminoxane (alumoxane) is represented by the following formula:

(1)

(2)

wherein R is a hydrocarbon group, such as methyl, ethyl, propyl or butyl, preferably methyl or ethyl, particularly preferably methyl; and m is an integer of 2 or greater, preferably an integer of 5 to 40.

The aluminoxane may be formed from mixed alkyloxy-aluminum units consisting of alkyloxyaluminum units represented by the formula $(OAl(R^1))$ and alkyloxyaluminum units represented by the formula $(OAl(R^2))$ ($R^1$ and $R^1$ are each the same hydrocarbon group as described for the above R, and $R^1$ and $R^2$ are different from each other).

The organoaluminum oxy-compound may contain a small amount of an organic compound of a metal other than aluminum.

In the present invention, the α-olefin of 2 to 20 carbon atoms, the conjugated diene monomer and optionally the aromatic vinyl compound are copolymerized in the presence of the above-described metallocene compound generally in a liquid phase. In this copolymerization, a hydrocarbon solvent is generally used, but an α-olefin may be used as a solvent. The copolymerization can be carried out by any of batchwise and continuous processes.

When the copolymerization is batchwise conducted in the presence of the metallocene catalyst, the metallocene compound is used in an amount of usually 0.00005 to 1 mmol, preferably 0.0001 to 0.5 mmol, based on 1 liter of the polymerization volume.

The organoaluminum oxy-compound is used in such an amount that the molar ratio of the aluminum atom (Al) to the transition metal atom (M) of the metallocene compound (Al/M) becomes 1 to 10,000, preferably 10 to 5,000.

The ionizing ionic compound is used in such an amount that the molar ratio of the ionizing ionic compound to the metallocene compound (ionizing ionic compound/metallocene compound) becomes 0.5 to 20, preferably 1 to 10.

If the organoaluminum compound is used, the amount thereof is in the range of usually about 0 to 5 mmol, preferably about 0 to 2 mmol, based on 1 liter of the polymerization volume.

The copolymerization reaction is carried out under the conditions of a temperature of usually -20 to 150° C., preferably 0 to 120° C., more preferably 0 to 100° C., and a pressure of more than 0 kg/cm² and not more than 80 kg/cm², preferably more than 0 kg/cm² and not more than 50 kg/cm².

Though the reaction time (mean residence time in case of continuous polymerization process) varies depending upon the conditions such as catalyst concentration and polymerization temperature, it is in the range of usually 5 minutes to 3 hours, preferably 10 minutes to 1.5 hours.

The α-olefin of 2 to 20 carbon atoms, the conjugated diene monomer and optionally the aromatic vinyl compound are fed to the polymerization reaction system in such amounts that the unsaturated olefin copolymer (A) having the aforesaid specific component ratio can be obtained. In the copolymerization, a molecular weight modifier such as hydrogen can be employed.

When the α-olefin of 2 to 20 carbon atoms, the conjugated diene monomer and optionally the aromatic vinyl compound are copolymerized, the unsaturated olefin copolymer is obtained generally as a polymerization liquid containing said copolymer. The polymerization solution is treated in a conventional manner to obtain the unsaturated olefin copolymer (A).

In the present invention, the unsaturated olefin copolymer (A) can be variously modified, since it has double bonds in the main chain and the side chain. By the modification with a peroxide, the double bonds can be epoxidized to introduce epoxy groups having high reactivity into the copolymer. This makes it possible to use the copolymer as a thermosetting resin or a reactive resin. Further, the double bonds can be utilized for Diels-Alder reaction and Michael addition reaction. Moreover, the double bonds of the main chain can be selectively hydrogenated to saturate them, whereby the heat resistance and the ozone resistance of the copolymer can be further improved.

In the present invention, the unsaturated olefin copolymer (A) can be modified partially or wholly with an unsaturated carboxylic acid, its derivative or an aromatic vinyl compound, and the degree of modification is preferably in the range of 0.01 to 30% by weight.

Especially in the unsaturated olefin copolymer (A), the double bonds are present in the side chain, and therefore the amount of a radical initiator used for the modification can be reduced. In contrast, in resins having no double bond in the side chain, a radical produced by hydrogen abstraction reaction is an initiation point. Since not all of the initiators induce the hydrogen abstraction reaction, a large amount of the initiator is necessary. Besides, the molecular weight is generally lowered because decomposition reaction also takes place.

In the unsaturated olefin copolymer (A) for use in the invention, however, terminal double bonds are present in the side chain, so that the amount of the radical initiator can be decreased. Besides, the produced radical reacts with the double bonds, whereby the decomposition reaction can be inhibited, and thereby lowering of the molecular weight can be also inhibited.

The monomer used for the modification (referred to as "graft monomer" hereinafter) is an unsaturated carboxylic acid, its derivative or an aromatic vinyl compound.

Examples of the unsaturated carboxylic acids include acrylic acid, methacrylic acid, maleic acid, fumaric acid and itaconic acid.

Examples of the derivatives of unsaturated carboxylic acids include anhydrides, esters, amides, imides and metallic salts of unsaturated carboxylic acids. Specifically, there can be mentioned maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Of the graft monomers, maleic anhydride is preferably employed.

Examples of the aromatic vinyl compounds include: styrene;

mono or polyalkylstyrenes, such as o-methylstyrene, m-methylstyrene, p-methylstyrene, o,p-dimethylstyrene, o-ethylstyrene, m-ethylstyrene and p-ethylstyrene;

functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and others, such as 3-phenylpropylene, 4-phenylbutene and α-methylstyrene.

Of these, styrene or 4-methoxystyrene is preferable.

For graft copolymerizing the unsaturated olefin copolymer with the graft monomer to prepare a modified copolymer, various known processes are available.

For example, the unsaturated olefin copolymer and the graft monomer are heated at a high temperature in the presence or absence of a solvent and in the presence or absence of a radical initiator to perform graft copolymerization.

In order to prepare a partially or wholly graft-modified unsaturated olefin copolymer having a graft ratio of 0.01 to 30% by weight, it is preferable from the viewpoint of industrial production that a graft-modified unsaturated olefin copolymer having a high graft ratio is first prepared and the thus graft-modified unsaturated olefin copolymer is then added to an unmodified unsaturated olefin copolymer to adjust the graft ratio. In this process, the concentration of the graft monomer in the composition can be properly adjusted. The copolymer obtained by this process is referred to as "partially graft-modified unsaturated olefin copolymer". It is also possible that a given amount of a graft monomer is blended with the unsaturated olefin copolymer from the first to perform graft modification. The copolymer obtained by this process is referred to as "wholly graft-modified unsaturated olefin copolymer".

As for the degree of modification of the unsaturated olefin copolymer with the graft monomer, the graft ratio to the graft-modified copolymer or the whole mixture of the graft-modified and unmodified copolymers is in the range of preferably 0.01 to 30% by weight, particularly preferably 0.05 to 10% by weight.

(B) Diene Rubber and Ethylene/α-Olefin/Nonconjugated Copolymer Rubber

The diene rubber employable as the component (B) in the invention is a rubber having double bonds in the main chain, and an iodine value of preferably not less than 100 g$I_2$/100 g polymer. The diene rubber further includes a hydrogenated rubber having an iodine value of not less than 100 g$I_2$/100 g polymer, for example, a hydrogenated nitrile rubbers as mentioned below. Such a diene rubber may be a diene rubber commonly known, and examples thereof include natural rubber (NR), isoprene rubber (IR), styrene-butadiene rubber (SBR), butadiene rubber (BR), chloroprene rubber (CR) and acrylonitrile/butadiene rubber (NBR).

As the natural rubber (NR), natural rubber standardized by "Green Book" (International Natural Rubber Grading Standard) is generally employed.

As the isoprene rubber (IR), isoprene rubber having a specific gravity of 0.91 to 0.94 and a Mooney viscosity [$ML_{1+4}$(100° C.)] of 30 to 120 is generally employed.

As the styrene-butadiene rubber (SBR), styrene-butadiene rubber having a specific gravity of 0.91 to 0.98 and a Mooney viscosity [$ML_{1+4}(100°$ C.)] of 20 to 120 is generally employed.

As the butadiene rubber (BR), butadiene rubber having a specific gravity of 0.90 to 0.95 and a Mooney viscosity [$ML_{1+4}(100°$ C.)] of 20 to 120 is generally employed.

Other rubbers such as a chloroprene rubber are also employable.

These diene rubbers can be used singly or in combination of two or more kinds. of the above diene rubbers, preferably used are natural rubber, isoprene rubber, SBR, BR and mixtures of these rubbers.

The unsaturated elastomer composition containing the diene rubber is excellent in vibration damping properties, vibration insulation properties and strength properties.

The nitrile rubber used as the diene rubber in the invention is a copolymer containing butadiene and acrylonitrile as main components. Specifically, nitrile rubber having an acrylonitrile content of 10 to 40% by weight and having a Mooney viscosity [$ML_{1+4}(100°$ C.)] of 20 to 100 is employed.

The hydrogenated nitrile rubber used as the diene rubber in the invention is a rubber obtained by hydrogenating the above-described nitrile rubber. Specifically, a rubber having an iodine value of 2 to 40 is employed.

The nitrile rubber and the hydrogenated nitrile rubber can be used singly or in combination.

The unsaturated elastomer composition containing the nitrile rubber and/or the hydrogenated nitrile rubber is excellent in oil resistance and dynamic fatigue resistance (flexural fatigue resistance).

The ethylene/α-olefin/nonconjugated polyene copolymer rubber employable as the component (B) in the invention mainly comprises constituent units derived from ethylene, constituent units derived from an α-olefin and constituent units derived from a nonconjugated polyene.

Examples of the α-olefins include α-olefins of 3 to 8 carbon atoms, such as propylene, 1-butene, 1-pentene, 4-methyl-1-pentene, 1-hexene and 1-octene. Of these, propylene, 1-butene, 1-hexene and 1-octene are preferably employed.

The molar ratio of the constituent units derived from ethylene to the constituent units derived from the α-olefin (ethylenel/α-olefin), both of which form the ethylene/α-olefin/nonconjugated polyene copolymer rubber, is in the range of 50/50 to 95/5, preferably 55/45 to 93/7, more preferably 60/40 to 91/9.

Examples of the nonconjugated polyenes include 1,4-hexadiene, 5-ethylidene-2-norbornene, 5-vinyl-2-norbornene, 5-isopropenyl-2-norbornene, dicyclopentadiene, nonconjugated trienes and nonconjugated tetraenes. Of these, 5-ethylidene-2 -norbornene, dicylopentadiene and 8-methyl-4-ethylidene-1,7-nonadiene (EMND) are preferably employed.

It is desirable that the constituent units derived from the nonconjugated polyene are contained in an amount of 0.1 to 10% by mol, preferably 0.5 to 7% by mol, more preferably 1 to 5% by mol.

The ethylene/α-olefin/nonconjugated polyene copolymer rubber desirably has an iodine value of 1 to 50, preferably 4 to 40, more preferably 6 to 30.

The ethylene/α-olefin/nonconjugated polyene copolymer rubber for use in the invention has an intrinsic viscosity (η), as measured in decalin at 135° C., of 0.8 to 5 dl/g, preferably 0.9 to 4 dl/g, more preferably 1.0 to 3 dl/g. When the ethylene/α-olefin/nonconjugated polyene copolymer rubber having an intrinsic viscosity (η) in the above range is used, an unsaturated elastomer composition having high vulcanizing rate can be obtained, and besides a vulcanized rubber having excellent strength properties can be obtained from the composition. The vulcanized rubber also has excellent weathering resistance.

Unsaturated Elastomer Composition

In the unsaturated elastomer composition of the invention, it is desirable that the weight ratio of the unsaturated olefin copolymer (A) to the diene rubber and/or the ethylene/α-olefin/nonconjugated polyene copolymer rubber (B) ((A)/(B)) is in the range of 1/99 to 99/1, preferably 1/99 to 90/10, more preferably 2/98 to 80/20, still more preferably 2/98 to 70/30.

The unsaturated elastomer composition may be compounded with a rubber reinforcing agent, such as carbon black (e.g., SRF, GPF, FEF, HAF, ISAF, SAF, FT and MT) or finely divided silicic acid; and a filler, such as precipitated calcium carbonate light, calcium carbonate heavy, talc, clay or silica.

Though the type and the amount of the rubber reinforcing agent or the filler used can be properly determined according to the intended use of the unsaturated elastomer composition, the amount thereof is usually not more than 300 parts by weight, preferably not more than 200 parts by weight, based on 100 parts by weight of the total of the unsaturated olefin copolymer (A) and the diene rubber and/or the ethylene/α-olefin/nonconjugated diene copolymer rubber (B).

The unsaturated elastomer composition of the invention can be prepared by blending the unsaturated olefin copolymer (A), the diene rubber and/or the ethylene/α-olefin/nonconjugated diene copolymer rubber (B), and optionally, the rubber reinforcing agent and the filler, and kneading them in a conventional manner.

The unsaturated elastomer composition of the invention can be used as an unvulcanized form, but when the composition is used as a vulcanized product, its properties can be most effectively exhibited. That is, the unsaturated elastomer composition shows a high vulcanizing rate, and from the composition, a vulcanized product having excellent strength properties, weathering resistance and ozone resistance can be obtained.

In order to produce a vulcanized product from the unsaturated elastomer composition of the invention, an unvulcanized compounded rubber is first prepared, then molded into a desired shape and vulcanized, similarly to the case of vulcanizing common rubbers.

The vulcanization may be conducted by the use of a vulcanizing agent or by irradiation with electron rays.

In case of vulcanization by the use of a vulcanizing agent, the unvulcanized compounded rubber can be prepared by mixing the unsaturated olefin copolymer (A), the diene rubber and/or the ethylene/α-olefin/nonconjugated polyene copolymer rubber (B), a vulcanizing agent, and optionally, a vulcanization accelerator, a vulcanization aid, a filler, a softener, etc., and kneading the mixture.

In case of vulcanization by irradiation with electron rays, the unvulcanized compounded rubber can be prepared by mixing the unsaturated olefin copolymer (A), the diene rubber and/or the ethylene/α-olefin/nonconjugated polyene copolymer rubber (B), and optionally, a filler, a softener, etc., and kneading the mixture.

The total amount of the unsaturated olefin copolymer (A) and the diene rubber and/or the ethylene/α-olefin/nonconjugated polyene copolymer rubber (B) in the unvulcanized compounded rubber can be properly determined according to the performance and the intended use of the vulcanized product, but in general, the total amount is not less than 20% by weight, preferably not less than 25% by weight.

The weight ratio of the unsaturated olefin copolymer (A) to the diene rubber and/or the ethylene/α-olefin/nonconjugated polyene copolymer rubber (B) ((A)/(B)) is in the range of 1/99 to 99/1, preferably 1/99 to 90/10, more preferably 2/98 to 80/20, still more preferably 2/98 to 70/30.

As the softeners, those commonly added to rubbers can be widely used.

Examples of the softeners include:

petroleum type softeners, such as process oil, lubricating oil, paraffin, liquid paraffin, petroleum asphalt and vaseline;

coal tar type softeners, such as coal tar and coal tar pitch;

fatty oil type softeners, such as castor oil, linseed oil, rapeseed oil and coconut oil;

tall oil;

factice;

waxes, such as beeswax, carnauba wax and lanolin;

fatty acids and fatty acid salts, such as ricinolic acid, palmitic acid, barium stearate, calcium stearate and zinc laurate; and synthetic high-molecular materials, such as petroleum resins, atactic polypropylene and coumarone-indene resin.

Of these, preferably used are petroleum type softeners, and particularly preferably used is process oil.

Though the amount of the softener can be properly determined according to the intended use of the vulcanized product, it is usually not more than 150 parts by weight, preferably not more than 100 parts by weight, based on 100 parts by weight of the total of the unsaturated olefin copolymer (A) and the diene rubber and/or the ethylene/α-olefin/nonconjugated polyene copolymer rubber (B).

The vulcanizing agent is, for example, a sulfur compound, an organic peroxide, a quinoid or a phenolic resin.

Examples of the sulfur compounds include sulfur, sulfur chloride, sulfur dichloride, morpholine disulfide, alkylphenol disulfide, tetramethylthiuram disulfide and selenium dimethyldithiocarbamate. Of these, sulfur is preferably employed.

The sulfur compound is used in an amount of usually 0.1 to 10 parts by weight, preferably 0.5 to 5 parts by weight, based on 100 parts by weight of the total of the unsaturated olefin copolymer (A) and the diene rubber and/or the ethylene/α-olefin/nonconjugated polyene copolymer rubber (B).

When the sulfur compound is used as the vulcanizing agent, it is preferable to use a vulcanization accelerator in combination.

Examples of the vulcanization accelerators include:

thiazole compounds, such as N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine (DPG), triphenylguanidine, diorthonitrileguanidine, orthonitrile biguanide and diphenylguanidine phthalate;

aldehyde amine compounds or aldehyde ammonia compounds, such as acetaldehyde-aniline reaction product, butylaldehyde-aniline condensate, hexamethylenetetramine and acetaldehyde ammonia;

imidazoline compounds, such as 2-mercaptoimidazoline;

thiourea compounds, such as thiocarbanilide, diethylthiourea, dubutylthiourea, trimethylthiourea and diorthotolylthiourea;

thiuram compounds, such as tetramethylthiuram monosulfide, tetramethylthiuram disulfide, tetraethylthiuram disulfide, tetrabutylthiuram disulfide and pentamethylenethiuram tetrasulfide;

dithio acid salt compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate compounds, such as zinc dibutoxyxanthate; and other compounds, such as zinc white.

The vulcanization accelerator is used in an amount of 0.1 to 20 parts by weight, preferably 0.2 to 10 parts by weight, based on 100 parts by weight of the total of the unsaturated olefin copolymer (A) and the diene rubber and/or the ethylene/α-olefin/nonconjugated polyene copolymer rubber (B).

As the organic peroxides, those commonly used for peroxide vulcanization of rubbers can be widely used. Examples of the organic peroxides include dicumyl peroxide, di-t-butyl peroxide, di-t-butylperoxy-3,3,5-trimethylcyclohexane, t-butyl hydroperoxide, t-butylcumyl peroxide, benzoyl peroxide, 2,5-dimethyl-2,5-di(t-butylperoxy)hexyne-3, 2,5-dimethyl-2,5-di(benzoylperoxy)hexane, 2,5-dimethyl-2,5-mono(t-butylperoxy)hexane and α,α'-bis(t-butylperoxy-m-isopropyl)benzene. Of these, dicumyl peroxide, di-t-butyl peroxide and di-t-butylperoxy-3,3,5-trimethylcyclohexane are preferably employed. These organic peroxides can be used singly or in combination of two or more kinds.

The organic peroxide is used in an amount of 0.0003 to 0.05 mol, preferably 0.001 to 0.03 mol, based on 100 g of the total of the unsaturated olefin copolymer (A) and the diene rubber and/or the ethylene/α-olefin/nonconjugated polyene copolymer rubber (B).

When the organic peroxide is used as the vulcanizing agent, it is preferable to use a vulcanization aid in combination. Examples of the vulcanization aids include sulfur; quinone dioxime compounds such as p-quinone dioxime; methacrylate compounds such as polyethylene glycol dimethacrylate; allyl compounds such as diallyl phthalate and triallyl cyanurate; maleimide compounds; and divinylbenzene.

The vulcanization aid is used in an amount of 0.5 to 2 mol based on 1 mol of the organic peroxide used, preferably about equimolar amount to the organic peroxide.

In the present invention, to the unvulcanized compounded rubber may be further added a rubber reinforcing agent, an anti-aging agent and a processing aid, and the type and the amount thereof can be properly determined according to the intended use or the performance of the vulcanized product.

There is no specific limitation on the process for preparing the vulcanized product. For example, the following processes are available.

In case of the vulcanization using a vulcanizing agent, the unsaturated olefin copolymer (A), the diene rubber and/or the ethylene/α-olefin/nonconjugated polyene copolymer rubber (B), and optionally, a filler, a softener, etc. are kneaded at a temperature of 80 to 170° C. for a period of 3 to 10 minutes using a mixer such as a Banbury mixer. Then, using rolls such as open rolls, the vulcanizing agent and optionally the vulcanization accelerator are added, the mixture is kneaded at a roll temperature of 40 to 80° C. for a period of 5 to 30 minutes, and the kneadate was rolled to prepare an unvulcanized compounded rubber in the form of a ribbon or a sheet.

The unvulcanized compounded rubber prepared as above is then molded into a desired shape by means of an extrusion molding machine, a calender roll or a press. Simultaneously with the molding, the compounded rubber is heated at a temperature of 150 to 270° C. for a period of 1 to 30 minutes, or after the molding, the molded product is introduced into a vulcanization bath and heated at a temperature of 150 to 270° C. for a period of 1 to 30 minutes, to obtain a vulcanized product. The vulcanization may be conducted in a mold or may be conducted using no mold. In case of using no mold, the vulcanization process is generally carried out continuously. For heating the molded product in the vulcanization bath, various heating means, such as hot air, glass bead fluidized bed, UHF (ultra high frequency electromagnetic wave) and steam (heating bath), can be employed.

In case of the vulcanization by irradiation with electron rays, the unsaturated olefin copolymer (A), the diene rubber and/or the ethylene/α-olefin/nonconjugated polyene copolymer rubber (B), and optionally, a filler, a softener, etc. are kneaded at a temperature of 80 to 170° C. for a period of 3 to 10 minutes using a mixer such as a Banbury mixer. Then, using rolls such as open rolls, the mixture is kneaded at a roll temperature of 40 to 80° C. for a period of 5 to 30 minutes, and the kneadate was rolled to prepare an unvulcanized compounded rubber in the form of a ribbon or a sheet.

The unvulcanized compounded rubber prepared as above is then molded into a desired shape by means of an extrusion molding machine, a calender roll or a press, and the molded product is irradiated with electron rays to obtain a vulcanized product. It is desirable that the irradiation with electron rays is carried out in such a manner that electron rays having energy of 0.1 to 10 MeV (megaelectron volt), preferably 0.3 to 2 MeV, is applied so that the absorbed dose becomes 0.5 to 35 Mrad (megarad), preferably 0.5 to 10 Mrad.

The vulcanized product obtained as above is excellent in vibration damping properties, vibration insulation properties and strength properties as well as in heat resistance, weathering resistance and dynamic fatigue resistance. Further, the vulcanized product has excellent surface hardness.

The vulcanized product can be used for automobile industrial parts, such as tires, rubber vibration insulators and covering materials of vibrating parts; industrial rubber products, such as rubber rolls and belts; electrical insulating materials; civil engineering and building materials; and rubberized fabrics.

Especially in the uses where high dynamic fatigue resistance is required, the vulcanized product exerts excellent performance, and for this reason, the vulcanized product is favorably used for, for example, tire side walls, rubber vibration insulators, rubber rolls, belts, hoses, wiper blades and various packing.

The unsaturated elastomer composition of the invention is now described in relation to various use application.

(1) The unsaturated elastomer composition comprising the unsaturated olefin copolymer (A) and SBR as the component (B) is preferably used for tire side walls, tire treads, belts and wiper blades.

The unsaturated olefin copolymer (A) applied to these uses is preferably the unsaturated olefin copolymer (A-2) having a molar ratio of the constituent units derived from ethylene to the constituent units derived from the α-olefin of 3 to 20 carbon atoms ranging from 73/27 to 99/1, having an iodine value of not less than 30 and containing styrene. It is desirable that the blending weight ratio of the component (A) to the SBR (B1) ((A)/(B1)) is in the range of 5/95 to 40/60, preferably 15/85 to 30/70, more preferably 25/75 to 30/70. When butadiene or isoprene is contained as a component of the unsaturated olefin copolymer (A), the copolymer has good compatibility with the component (B), and an unsaturated elastomer composition having excellent properties can be obtained. When styrene is contained as a component of the unsaturated olefin copolymer (A), the copolymer has better compatibility.

(2) The unsaturated elastomer composition comprising the unsaturated olefin copolymer (A) and NBR as the component (B) is preferably used for various packing (e.g., O-ring), diaphragms, glass channels and belts.

The unsaturated olefin copolymer (A) used for various packing and diaphragms is preferably an unsaturated olefin copolymer having a molar ratio of the constituent units derived from ethylene to the constituent units derived from the α-olefin of 3 to 20 carbon atoms ranging from 70/30 to 60/40 and having an intrinsic viscosity (η) (measured in decalin at 135° C.) of 2 to 3 dl/g. It is desirable that the blending weight ratio of the component (A) to the NBR (B2) ((A)/(B2)) is in the range of 5/95 to 40/60, preferably 25/75 to 30/70.

The unsaturated olefin copolymer (A) used for glass channels and belts is preferably an unsaturated olefin copolymer having a molar ratio of the constituent units derived from ethylene to the constituent units derived from the α-olefin of 3 to 20 carbon atoms ranging from 70/30 to 99/1. It is desirable that the blending weight ratio of the component (A) to the NBR (B2) ((A)/(B2)) is in the range of 95/5 to 60/40, preferably 85/15 to 70/30.

When butadiene or isoprene is contained as a component of the unsaturated olefin copolymer (A), the copolymer has good compatibility with the component (B), and an unsaturated elastomer composition having excellent peel strength can be obtained.

When hydrogenated NBR is used as the diene rubber (B), high efficiency of peroxy crosslinking is obtained, and besides compression permanent set (CS) and permanent set (PS) are improved.

(3) The unsaturated elastomer composition comprising the unsaturated olefin copolymer (A) and the, ethylene/α-olefin/nonconjugated polyene copolymer rubber as the component (B) is preferably used for belts (particularly heat-resistant belt) and hoses.

The unsaturated olefin copolymer (A) applied to these uses is preferably an unsaturated olefin copolymer having an intrinsic viscosity (η), as measured in decalin at 135° C., of 1.0 to 2.5 dl/g, preferably 1.5 to 2.5 dl/g.

The ethylene/α-olefin/nonconjugated polyene copolymer rubber (B3) used as the component (B) is desirably an ethylene/α-olefin/nonconjugated polyene copolymer rubber having an intrinsic viscosity (η), as measured in decalin at 135° C., of 3.0 to 10.0 dl/g, preferably 3.0 to 4.5 dl/g. It is desirable that the blending weight ratio of the component (A) to the component (B3) ((A)/(B3)) is in the range of 1/99 to 70/30, preferably 15/85 to 60/40. Use of the component (B3) and the component (A) in combination gives higher efficiency of peroxy crosslinking than single use of the component (B3), and besides compression permanent set (CS) and permanent set (PS) are further improved.

From the unsaturated elastomer composition of the invention, a foamed product can be produced. The foamed product can be produced by adding a foaming agent commonly used for rubbers and if necessary a foaming aid to the composition and conducting foaming.

The foaming agent is used in an amount of 0.5 to 30 parts by weight, preferably 1 to 20 parts by weight, based 100 parts by weight of the total of the unsaturated olefin copolymer (A) and the diene rubber and/or the ethylene/α-olefin/nonconjugated polyene copolymer rubber (B).

The resulting foamed product has an apparent specific gravity of usually 0.03 to 0.7.

The foamed product can be used for heat insulating materials, cushioning materials and sealing materials.

The unsaturated elastomer composition of the invention can be favorably used for freezer bags, decorative films, tablecloths and book covers in the form of films or sheets; for medical instruments in the form or tubes; and for food containers, stationery, daily necessaries (e.g., cleaner bumper, cutting mat, bathtub cover, transfusion set) and automobile interior trims. When the unsaturated olefin copolymer (A) contains the aromatic vinyl compound, the composition is particularly preferably applied to these uses. These uses are uses to which "soft vinyl chloride resin" is commonly applied, and the unsaturated elastomer composition of the invention can be used as a substitute for the soft vinyl chloride resin.

EFFECT OF THE INVENTION

From the unsaturated elastomer composition according to the invention, a vulcanized product excellent in vibration damping properties, vibration insulation properties and strength properties as well as in heat resistance, weathering resistant, ozone resistance and dynamic fatigue resistance can be obtained.

EXAMPLE

The present invention is further described with reference to the following examples, but it should be construed that the invention is in no way limited to those examples.

Synthesis 1

Pre-Activation of Catalyst 16.0 Milligrams of isopropylidene-bis(indenyl)zirconium dichloride synthesized by a generally known process was weighed out and introduced into a glass container thoroughly purged with nitrogen. To the container, 15.2 ml of a toluene solution of methylaluminoxane (1.484 mmol/ml, referred to as "MAO" hereinafter) was added so that the amount of aluminum atom became 22.57 mmol, and the resulting mixture was subjected to ultrasonic irradiation at 23° C. for 15 minutes to prepare a catalyst solution.

Synthesis of Ethylene/Propylene/Isoprene Copolymer

To a 2-liter autoclave vacuum dried and purged with nitrogen, 177.2 ml of toluene, 60 ml of isoprene and 5,500 ml of propylene (25° C., 1 atom) were introduced at ordinary temperature. Subsequently, 0.3 ml of a toluene solution of triisobutylaluminum (1.0 mmol/ml) was added, and ethylene was fed with stirring so that the pressure of the system became 6 kg/cm$^2$-G, followed by releasing of the pressure.

The operations of pressurizing and pressure-releasing were repeated three times. Thereafter, the system was set at 20° C. under normal pressure of ethylene and then pressurized to 6 kg/cm$^2$-G with ethylene. To the system, 1.52 ml of the catalyst solution prepared above was added to initiate copolymerization of ethylene, propylene and isoprene. As for the catalyst concentration, the isopropylidene-bis(indenyl) zirconium dichloride concentration in the whole system was 0.0123 mmol/L and the MAO concentration in the whole system was 7.5 mmol/L. During the polymerization, ethylene was continuously fed to maintain the internal pressure at 6 kg/cm$^2$-G. After 30 minutes, methyl alcohol was added to terminate the polymerization reaction. After release of pressure, the polymer solution was drawn out. To the polymer solution, an aqueous solution containing 5 ml of concentrated hydrochloric acid per 1 liter of water was added in a ratio of 1:1 (polymer solution:aqueous solution) to wash the polymer solution, whereby a catalyst residue was transferred into an aqueous phase. The resulting mixed solution was allowed to stand, and the aqueous phase was removed by separation. The remainder was washed twice with distilled water and subjected to oil-water separation. The polymerization liquid phase obtained by the oil-water separation was contacted with acetone in an amount of three times as much as the liquid phase with vigorous stirring to precipitate a polymer. The polymer was sufficiently washed with acetone, and the solid portion (copolymer) was collected by filtration. The copolymer was dried at 130° C. and 350 mmHg for 12 hours in a stream of nitrogen.

Thus, an ethylene/propylene/isoprene copolymer was obtained in a yield of 18.8 g. The copolymer had an intrinsic viscosity ($\eta$) (measured in decalin at 135° C.) of 1.4 dl/g, a glass transition temperature Tg of −40° C., an iodine value of 15 g/100 g, an ethylene content of 68.8% by mol, a propylene content of 25.7% by mol,. a ring structure content of 3.5% by mol, a 1,2-addition structure content of 0.05% by mol, a 3,4-addition structure content of 1.25% by mol, a 1,4-addition structure content of 0.7% by mol and an activity of 10 kg/mmol-Zr·hr.

The results are set forth in Table 3.

Synthesis 2

Pre-Activation of Catalyst 13.5 Milligrams of (dimethyl(t-butylamido)(tetramethyl-$\eta^5$-cyclopentadienyl)silane)dichloride titanium synthesized by a generally known process was weighed out and introduced into a glass container thoroughly purged with nitrogen. To the container, 22.86 ml of a toluene solution of methylaluminoxane (0.808 mmol/ml, referred to as "MAO" hereinafter) was added so that the amount of aluminum atom became 22.05 mmol, and the resulting mixture was subjected to ultrasonic irradiation at 23° C. for 15 minutes to prepare a catalyst solution.

Synthesis of Ethylene/Propylene/Styrene/1,3-Butadiene Copolymer

To a 2-liter autoclave vacuum dried and purged with nitrogen, 440.6 ml of toluene was introduced at ordinary temperature. Subsequently, ethylene was fed with stirring so that the pressure of the system became 6 kg/cm$^2$-G, followed by releasing of the pressure. The operations of pressurizing and pressure-releasing were repeated three times. Thereafter, 10 ml of styrene (25° C., 1 atom) 13 ml of 1,3-butadiene (25° C., 1 atom) and 4,400 ml of propylene (25° C., 1 atom) were added at normal pressure of ethylene, and the system was set at 20° C. Then, the system was pressurized to 6 kg/cm²-G with ethylene, and 3.11 ml of the catalyst solution prepared above was added to initiate copolymerization of ethylene, propylene, styrene and 1,3-butadiene. As for the catalyst concentration, the (dimethyl (t-butylamido)(tetramethyl-η⁵-cyclopentadienyl)silane) dichloride titanium concentration in the whole system was 0.01 mmol/L and the MAO concentration in the whole system was 6.0 mmol/L. During the polymerization, ethylene was continuously fed to maintain the internal pressure at 6 kg/cm²-G. After 15 minutes, methyl alcohol was added to terminate the polymerization reaction. After release of pressure, the polymer solution was drawn out. To the polymer solution, an aqueous solution containing 5 ml of concentrated hydrochloric acid per 1 liter of water was added in a ratio of 1:1 (polymer solution:aqueous solution) to wash the polymer solution, whereby a catalyst residue was transferred into an aqueous phase. The resulting mixed solution was allowed to stand, and the aqueous phase was removed by separation. The remainder was washed twice with distilled water and then subjected to oil-water separation. The polymerization liquid phase obtained by the oil-water separation was contacted with acetone in an amount of three times as much as the liquid phase with vigorous stirring to precipitate a polymer. The polymer was sufficiently washed with acetone, and the solid portion (copolymer) was collected by filtration. The copolymer was dried at 130° C. and 350 mmHg for 12 hours in a stream of nitrogen.

Thus, an ethylene/propylene/styrene/1,3-butadiene copolymer was obtained in a yield of 9 g. The copolymer had an intrinsic viscosity (η) (measured in decalin at 135° C.) of 2.1 dl/g, a glass transition temperature Tg of −44° C., an iodine value of 17.5 g/100 g, an ethylene content of 63.6% by mol, a propylene content of 23.7% by mol, a styrene content of 5.4% by mol, a five-membered ring structure content of 4.8% by mol, a cyclopropane ring structure content of 0.1% by mol, a 1,2-addition structure content of 0.5% by mol, a 1,4-addition structure content of 1.9% by mol and an activity of 7.2 kg/mmol-Zr·hr.

The results are set forth in Table 3.

Synthesis 3

An unsaturated olefin copolymer was obtained in the same manner as in Synthesis 2, except that the (dimethyl(t-butylamido)(tetramethyl-η⁵-cyclopentadienyl)silane) dichloride titanium was replaced with isopropylidene-bis(indenyl)zirconium dichloride synthesized by a generally known process.

The ethylene/propylene/styrene/1,3-butadiene copolymer obtained above had an intrinsic viscosity (η) (measured in decalin at 135° C.) of 0.8 dl/g, a glass transition temperature Tg of −41° C., an iodine value of 17 g/100 g, an ethylene content of 65.1% by mol, a propylene content of 20.2% by mol, a styrene content of 7.8% by mol, a butadiene content of 6.9% by mol, a five-membered ring structure content of 4.4% by mol, a cyclopropane ring structure content of 0.1% by mol, a 1,2-addition structure content of 0.4% by mol and a 1,4-addition structure content of 2.0% by mol.

The results are set forth in Table 3.

TABLE 3

| (Unsaturated olefin copolymer) | | | |
|---|---|---|---|
| | Synthesis 1 | Synthesis 2 | Synthesis 3 |
| Composition of polymer (% by mol) | | | |
| Ethylene | 68.8 | 63.6 | 65.1 |
| Propylene | 25.7 | 23.7 | 20.2 |
| Styrene | — | 5.4 | 7.8 |
| Isoprene | 5.5 | — | — |
| 1,3-Butadiene | — | 7.3 | 6.9 |
| Diene structure | | | |
| 1,2-Addition | 0.05 | 0.5 | 0.4 |
| 3,4-Addition | 1.25 | — | — |
| 1,4-Addition | 0.7 | 1.9 | 2.0 |
| Cyclopentane ring | 3.5 | 4.8 | 4.4 |
| Cyclopropane ring | — | 0.1 | 0.1 |
| Properties of polymer | | | |
| (η) (dl/g) | 1.4 | 2.1 | 0.8 |
| Iodine value | 15 | 17.5 | 17 |
| Melting point (Tm,° C.) | — | — | — |
| Tg (° C.) | −40 | −44 | −41 |
| MW/Mn | 2.8 | 2.5 | 2.6 |

The melting point (Tm) and the glass transition temperature (Tg) in Table 3 were determined in the following manner.

An endothermic curve of the copolymer by DSC was sought, and the temperature at the maximum peak position in the endothermic curve was taken as the melting point (Tm) of the copolymer.

The measurement was made in a manner that a sample was placed in an aluminum pan, heated up to 200° C. at a rate of 10° C./min, maintained at 200° C. for 5 minutes, cooled to −150° C. at a rate of 20° C./min and heated at a rate of 10° C./min to obtain an endothermic curve. From the endothermic curve, the melting point was found.

The Mw/Mn in Table 3 was measured by GPC (gel permeation chromatography) at 140° C. using an orthodichlorobenzene solvent.

Example 1

Preparation of Vulcanized Rubber

30 Parts by weight of the ethylene/propylene/styrene/1,3-butadiene copolymer (referred to as "copolymer (2)" hereinafter) prepared in Synthesis 2, 70 parts by weight of SBR (trade name: Nipol 1502, available from Nippon Geon Co., Ltd., iodine value: 357), 5 parts by weight of zinc white, 1 part by weight of stearic acid, 50 parts by weight of HAF carbon black (trade name: HAF Asahi #70™, available from Asahi Carbon K.K.), 5 parts by weight of naphthenic oil (Sunthene 4240™, available from Sunoil K.K.), 0.5 part by weight of a vulcanization accelerator CBZ (trade name: Sanceler CM™, available from Sanshin Chemical Industry Co., Ltd.), 1 part by weight of a vulcanization accelerator DPG (trade name: Nocceler D™, available from Ouchi Shinko Chemical Industrial Co., Ltd.) and 2 parts by weight of sulfur were kneaded by open rolls (front roll/back roll: 50° C./60° C., 16 rpm/18 rpm), to prepare an unvulcanized compounded rubber.

The unvulcanized compounded rubber was heated for 20 minutes by means of a press having been heated to 160° C. to prepare a vulcanized rubber sheet, and the vulcanized rubber sheet was subjected to the following tests.

The results are set forth in Table 4.

Tensile Test

Tensile strength ($T_B$), elongation at break ($E_B$) and tension permanent set (PS) were measured in accordance with JIS K 6301.

Hardness Test

JIS A hardness ($H_S$) was measured in accordance with JIS K 6301.

Ozone Resistance Test

The ozone resistance test was carried out as a static test in an ozone test bath under the test conditions of an ozone concentration of 80 ppm, an extensibility of 80%, a temperature of 40° C. and a test period of 96 hours. The ozone resistance was evaluated by ranking the surface state based on the criteria of JIS K 6301. The evaluation criteria are as follows, and the surface state is ranked as, for example, "C-5".

Evaluation criteria of surface state

Number of cracks

A: There are a small number of cracks.
B: There are a large number of cracks.
C: There are innumerable cracks.

Size and depth of cracks

1: Cracks can be seen by a magnifying glass of 10 magnifications but not by naked eyes.
2: Cracks can be seen by naked eyes.
3: Cracks are deep and relatively large (less than 1 mm).
4: Cracks are deep and large (not less than 1 mm and less than 3 mm).
5: Cracks of not less than 3 mm are present, or breaking almost takes place.

Comparative Example 1

The procedure of Example 1 was repeated, except that the copolymer (2) was not used and the amount of SBR was varied to 100 parts by weight.

The results are set forth in Table 4.

Example 2

Preparation of Vulcanized Rubber

30 Parts by weight of the ethylene/propylene/isoprene copolymer (referred to as "copolymer (1)" hereinafter) prepared in Synthesis 1, 70 parts by weight of hydrogenated nitrile rubber (trade name: Zet pol 2020™, available from The Japanese Geon Co., Ltd., iodine value: 20), 5 parts by weight of zinc white, 1 part by weight of stearic acid, 40 parts by weight of FEF carbon black (trade name: #60, available from Asahi Carbon K.K.) and 5 parts by weight of an ethylene/vinyl acetate copolymer (trade name: Evaflex 45X™, available from Mitsui Du Pont Chemical K.K.) were kneaded by open rolls (front roll/back roll: 80° C./80° C., 16 rpm/18 rpm). Then, 7 parts by weight of dicumyl peroxide (trade name: Mitsui DPC-40C, Mitsui Texaco Chemical K.K.) was added, and the mixture was kneaded by open rolls (front roll/back roll: 50° C./60° C., 16 rpm/18 rpm) to prepare an unvulcanized compounded rubber.

The unvulcanized compounded rubber was sheeted and heated for 25 minutes by means of a press having been heated to 170° C., to prepare a vulcanized rubber sheet. The vulcanized rubber sheet was subjected to the aforesaid tests in the same manner as in Example 1 and further the following peel test and oil resistance test were conducted.

Peel Test

The peel test was carried out by interposing a Teflon sheet (width: 20 mm) between two unvulcanized rubber sheets, press vulcanizing them and then pulling the interposed portion by a chuck, to measure peel strength.

Oil Resistance Test

The oil resistance test was carried out in accordance with an immersion test defined by JIS K 6301, to measure a volume change ($\Delta V$ (%)) of a specimen. The oil resistance test was conducted under the conditions of a temperature of 100° C. and a test period of 72 hours using an oil of JIS No. 3 as a test oil.

The results are set forth in Table 5.

Comparative Example 2

The procedure of Example 2 was repeated, except that an ethylene/propylene/5-ethylidene-2-norbornene copolymer rubber (EPDM (1), ethylene content: 73% by mol, iodine value: 18, Mooney viscosity [$ML_{1+4}$(100° C.)]: 80) was used in place of the copolymer (1).

The results are set forth in Table 5.

Example 3

Preparation of Vulcanized Rubber

40 Parts by weight of the copolymer (1) prepared in Synthesis 1, 60 parts by weight of an ethylene/propylene/5-ethylidene-2-norbornene copolymer rubber (EPDM (2), ethylene content: 73% by mol, iodine value: 18, Mooney viscosity [$ML_{1+4}$(100° C.)]: 130), 5 parts by weight of zinc white, 1 part by weight of stearic acid, 50 parts by weight of FEF carbon black (trade name: #60, available from Asahi Carbon K.K.), 10 parts by weight of a mineral oil type process oil (trade name: PW-380, available from Idemitsu Co., Ltd.), 5 parts by weight of dicumyl peroxide (trade name: Mitsui DPC-40C, Mitsui Texaco Chemical K.K.) and 1 part by weight of triallyl isocyanurate (TAIC) were kneaded by open rolls (front roll/back roll: 50° C./60° C., 16 rpm/18 rpm), to prepare an unvulcanized compounded rubber.

The unvulcanized compounded rubber was heated for 30 minutes by means of a press having been heated to 160° C. to prepare a vulcanized rubber sheet, and the vulcanized rubber sheet was subjected to the following tests.

The results are set forth in Table 6.

Tensile Test

Tensile strength ($T_B$), elongation at break ($E_B$) and tension permanent set (PS) were measured in accordance with JIS K 6301.

Hardness Test

JIS A hardness ($H_S$) was measured in accordance with JIS K 6301.

Compression Set

The compression set (CS; compression conditions: 150° C., 22 hours), that is an indication of crosslink density, was measured by the method of JIS K 6301.

Comparative Example 3

The procedure of Example 3 was repeated, except that the copolymer (1) was not used and the amount of EPDM (2) was varied to 100 parts by weight.

The results are set forth in Table 6.

Example 4

The procedure of Example 1 was repeated, except that the unsaturated olefin copolymer of Synthesis 3 was used in place of the unsaturated olefin copolymer of Synthesis 1.

The results are set forth in Table 4.

TABLE 4

|  | Ex. 1 | Comp. Ex. 1 | Ex. 4 |
|---|---|---|---|
| Properties |  |  |  |
| $T_B$ (MPa) | 22 | 25 | 20 |
| $E_B$ (%) | 460 | 470 | 400 |
| $H_s$ (JIS A hardness) | 60 | 61 | 55 |
| Ozone resistance | no change | C-4 | no change |

TABLE 5

|  | Ex. 2 | Comp. Ex. 2 |
|---|---|---|
| Properties |  |  |
| $T_B$ (MPa) | 22 | 20 |
| $E_B$ (%) | 360 | 340 |
| $H_s$ (JIS A hardness) | 70 | 70 |
| Peel strength (kg/cm) | 5.9 | 4.5 |
| Oil resistance ΔV (%) | 25 | 36 |

TABLE 6

|  | Ex. 3 | Comp. Ex. 3 |
|---|---|---|
| Properties |  |  |
| $T_B$ (MPa) | 14 | 15 |
| $E_B$ (%) | 250 | 310 |
| $H_s$ (JIS A hardness) | 70 | 68 |
| PS (%) | 6 | 17 |
| CS (%) | 13 | 21 |

What is claimed is:

1. An unsaturated elastomer composition comprising:

(A-1) an unsaturated olefin copolymer of at least one α-olefin of 2 to 20 carbon atoms and a conjugated diene monomer represented by the following formula (I), and (B) at least one rubber selected from a diene rubber and an ethylene/α-olefin/nonconjugated polyene copolymer rubber, a weight ratio of said component (A-1) to said component (B) ((A-1)/(B)) being in the range of 1/99 to 99/1;

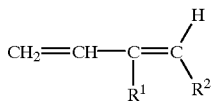
(I)

wherein $R^1$ and $R^2$ are each independently a hydrogen atom, an alkyl group of 1 to 8 carbon atoms or an aryl group, and at least one of $R^1$ and $R^2$ is a hydrogen atom.

2. An unsaturated elastomer composition comprising:

(A-2) an unsaturated olefin copolymer of at least one α-olefin of 2 to 20 carbon atoms, a conjugated diene monomer represented by the following formula (I) and an aromatic vinyl compound, and (B) at least one rubber selected from a diene rubber and an ethylene/α-olefin/nonconjugated polyene copolymer rubber, a weight ratio of said component (A-2) to said component (B) ((A-2)/(B)) being in the range of 1/99 to 99/1;

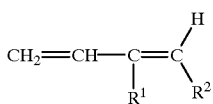
(I)

wherein $R^1$ and $R^2$ are each independently a hydrogen atom, an alkyl group of 1 to 8 carbon atoms or an aryl group, and at least one of $R^1$ and $R^2$ is a hydrogen atom.

3. The unsaturated elastomer composition as claimed in claim 1, wherein the unsaturated olefin copolymer (A-1) is an unsaturated olefin copolymer of ethylene, an α-olefin of 3 to 20 carbon atoms and the conjugated diene monomer represented by the formula (I).

4. The unsaturated elastomer composition as claimed in claim 2, wherein the unsaturated olefin copolymer (A-2) is an unsaturated olefin copolymer of ethylene, an α-olefin of 3 to 20 carbon atoms, the conjugated diene monomer represented by the formula (I) and the aromatic vinyl compound.

5. The unsaturated elastomer composition as claimed in claim 1 wherein the diene rubber as the component (B) is nitrile rubber and/or hydrogenated nitrile rubber.

6. The unsaturated elastomer composition as claimed in claim 2 wherein the diene rubber as the component (B) is nitrile rubber and/or hydrogenated nitrile rubber.

7. The unsaturated elastomer composition as claimed in claim 3, wherein the diene rubber as the component (B) is nitrile rubber and/or hydrogenated nitrile rubber.

8. The unsaturated elastomer composition as claimed in claim 4, wherein the diene rubber as the component (B) is nitrile rubber and/or hydrogenated nitrile rubber.

9. The unsaturated elastomer composition as claimed in claim 1, wherein the unsaturated olefin copolymer (A-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

10. The unsaturated elastomer composition as claimed in claim 3, wherein the unsaturated olefin copolymer (A-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

11. The unsaturated elastomer composition as claimed in claim 5, wherein the unsaturated olefin copolymer (A-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

12. The unsaturated elastomer composition as claimed in claim 7, wherein the unsaturated olefin copolymer (A-1) has a molar ratio of constituent units derived from ethylene to constituent units derived from the α-olefin of 3 to 20 carbon atoms (ethylene/α-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

13. The unsaturated elastomer composition as claimed in claim 2, wherein the unsaturated olefin copolymer (A-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds of all addition units/five-membered rings) is in the range of 20/80 to 90/10, and the content of the constituent units derived from the conjugated diene monomer is in the range of 0.01 to 30% by mol.

14. The unsaturated elastomer composition as claimed in claim 4, wherein the unsaturated olefin copolymer (A-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α/olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds of all addition units/five-membered rings) is in the range of 20/80 to 90/10, and the content of the constituent units derived from the conjugated diene monomer is in the range of 0.01 to 30% by mol.

15. The unsaturated elastomer composition as claimed in claim 6, wherein the unsaturated olefin copolymer (A-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds of all addition units/five-membered rings) is in the range of 20/80 to 90/10, and the content of the constituent units derived from the conjugated diene monomer is in the range of 0.01 to 30% by mol.

16. The unsaturated elastomer composition as claimed in claim 8, wherein the unsaturated olefin copolymer (A-2) has a molar ratio of constituent units derived from ethylene to constituent units derived from the α-olefin of 3 to 20 carbon atoms (ethylene/α-olefin) ranging from 99/1 to 40/60, has a molar ratio of the total of constituent units derived from ethylene and constituent units derived from the α-olefin of 3 to 20 carbon atoms to constituent units derived from the aromatic vinyl compound (ethylene+α-olefin/aromatic vinyl compound) ranging from 99.5/0.5 to 50/50, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds of all addition units/five-membered rings) is in the range of 20/80 to 90/10, and the content of the constituent units derived from the conjugated diene monomer is in the range of 0.01 to 30% by mol.

17. The unsaturated elastomer composition as claimed in claim 9, wherein the unsaturated olefin copolymer (A-1) has an intrinsic viscosity (η), as measured in decalin at 135° C., of 0.1 to 10 dl/g.

18. The unsaturated elastomer composition as claimed in claim 9, wherein the unsaturated olefin copolymer (A-1) has an iodine value of 1 to 50.

19. The unsaturated elastomer composition as claimed in claim 9, wherein the conjugated diene monomer of the unsaturated olefin copolymer (A-1) is 1,3-butadiene or isoprene.

20. The unsaturated elastomer composition as claimed in claim 9, wherein the diene rubber as the component (B) is at least one rubber selected from the group consisting of natural rubber, isoprene rubber, styrene-butadiene rubber and butadiene rubber.

21. The unsaturated elastomer composition as claimed in claim 9, wherein the ethylene/α-olefin/nonconjugated polyene copolymer rubber as the component (B) has an intrinsic viscosity (η), as measured in decalin at 135° C., of 0.8 to 5.0 dl/g.

22. The unsaturated elastomer composition as claimed in claim 9, wherein the ethylene/α-olefin/nonconjugated polyene copolymer rubber as the component (B) contains constituent units derived from the nonconjugated polyene in an amount of 0.1 to 5% by mol.

23. A vulcanized rubber obtained by vulcanizing the unsaturated elastomer composition as claimed in claim 9.

24. A vulcanized rubber obtained by dynamically heat treating the unsaturated elastomer composition as claimed in claim 9 in the presence of an organic peroxide.

25. The unsaturated elastomer composition as claimed in claim 10, wherein the unsaturated olefin copolymer (A-1) has an intrinsic viscosity (η), as measured in decalin at 135° C., of 0.1 to 10 dl/g.

26. The unsaturated elastomer composition as claimed in claim 10, wherein the unsaturated olefin copolymer (A-1) has an iodine value of 1 to 50.

27. The unsaturated elastomer composition as claimed in claim 10, wherein the conjugated diene monomer of the unsaturated olefin copolymer (A-1) is 1,3-butadiene or isoprene.

28. The unsaturated elastomer composition as claimed in claim 10, wherein the diene rubber as the component (B) is at least one rubber selected from the group consisting of natural rubber, isoprene rubber, styrene-butadiene rubber and butadiene rubber.

29. The unsaturated elastomer composition as claimed in claim 10, wherein the ethylene/α-olefin/nonconjugated polyene copolymer rubber as the component (B) has an intrinsic viscosity (η), as measured in decalin at 135° C., of 0.8 to 5.0 dl/g.

30. The unsaturated elastomer composition as claimed in claim 10, wherein the ethylene/α-olefin/nonconjugated polyene copolymer rubber as the component (B) contains constituent units derived from the nonconjugated polyene in an amount of 0.1 to 5% by mol.

31. A vulcanized rubber obtained by vulcanizing the unsaturated elastomer composition as claimed in claim 10.

32. A vulcanized rubber obtained by dynamically heat treating the unsaturated elastomer composition as claimed in claim 10 in the presence of an organic peroxide.

33. The unsaturated elastomer composition as claimed in claim 13, wherein the unsaturated olefin copolymer (A-2) has an intrinsic viscosity (η), as measured in decalin at 135° C., of 0.1 to 10 dl/g.

34. The unsaturated elastomer composition as claimed in claim 13, wherein the unsaturated olefin copolymer (A-2) has an iodine value of 1 to 50.

35. The unsaturated elastomer composition as claimed in claim 13, wherein the conjugated diene monomer of the unsaturated olefin copolymer (A-2) is 1,3-butadiene or isoprene.

36. The unsaturated elastomer composition as claimed in claim 13, wherein the diene rubber as the component (B) is at least one rubber selected from the group consisting of natural rubber, isoprene rubber, styrene-butadiene rubber and butadiene rubber.

37. The unsaturated elastomer composition as claimed in claim 13, wherein the ethylene/α-olefin/nonconjugated polyene copolymer rubber as the component (B) has an intrinsic viscosity (η), as measured in decalin at 135° C. of 0.8 to 5.0 dl/g.

38. The unsaturated elastomer composition as claimed in claim 13, wherein the ethylene/α-olefin/nonconjugated polyene copolymer rubber as the component (B) contains constituent units derived from the nonconjugated polyene in an amount of 0.1 to 5% by mol.

39. A vulcanized rubber obtained by vulcanizing the unsaturated elastomer composition as claimed in claim 13.

40. A vulcanized rubber obtained by dynamically heat treating the unsaturated elastomer composition as claimed in claim 13 in the presence of an organic peroxide.

41. The unsaturated elastomer composition as claimed in claim 14, wherein the unsaturated olefin copolymer (A-2) has an intrinsic viscosity (η), as measured in decalin at 135° C., of 0.1 to 10 dl/g.

42. The unsaturated elastomer composition as claimed in claim 14, wherein the unsaturated olefin copolymer (A-2) has an iodine value of 1 to 50.

43. The unsaturated elastomer composition as claimed in claim 14, wherein the conjugated diene monomer of the unsaturated olefin copolymer (A-2) is 1,3-butadiene or isoprene.

44. The unsaturated elastomer composition as claimed in claim 14, wherein the diene rubber as the component (B) is at least one rubber selected from the group consisting of natural rubber, isoprene rubber, styrene-butadiene rubber and butadiene rubber.

45. The unsaturated elastomer composition as claimed in claim 14, wherein the ethylene/α-olefin/nonconjugated polyene copolymer rubber as the component (B) has an intrinsic viscosity (η), as measured in decalin at 135° C., of 0.8 to 5.0 dl/g.

46. The unsaturated elastomer composition as claimed in claim 14, wherein the ethylene/α-olefin/nonconjugated polyene copolymer rubber as the component (B) contains constituent units derived form the nonconjugated polyene in an amount of 0.1 to 5% by mol.

47. A vulcanized rubber obtained by vulcanizing the unsaturated elastomer composition as claimed in claim 14.

48. A vulcanized rubber obtained by dynamically heat treating the unsaturated elastomer composition as claimed in claim 14, in the presence of an organic peroxide.

49. An unsaturated elastomer composition comprising:
(A-1) an unsaturated olefin copolymer wherein the unsaturated olefin copolymer (A-1) is an unsaturated olefin copolymer of ethylene, propylene and a conjugated diene monomer selected from the group consisting of butadiene and isoprene represented by the following formula (I), and
(B) is at least one rubber selected from the group consisting of natural rubber, isoprene rubber, styrene-butadiene rubber and butadiene rubber,
a weight ratio of said component (A-1) to said component (B) ((A-1)/(B)) being in the range of 1/99 to 99/1;

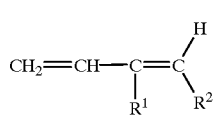

(I)

wherein $R^1$ is hydrogen atom or methyl and $R^2$ is a hydrogen atom, wherein the unsaturated olefin copolymer (A-1) has a molar ratio of constituent units derived from ethylene to constituent units derived from propylene (ethylene/propylene) ranging from 99/1 to 40/60, and (A-1) has an intrinsic viscosity (η), as measured in decalin at 135° C., of 0.1 to 10 dl/g and (A-1) has an iodine value of 1 to 50.

50. An unsaturated elastomer composition comprising:
(A-2) an unsaturated olefin copolymer wherein the unsaturated olefin copolymer (A-2) is an unsaturated olefin copolymer of ethylene, propylene and a conjugated diene monomer selected from the group consisting of butadiene and isoprene represented by the following formula (I) and styrene, and
(B) is at least one rubber selected from the group consisting of natural rubber, isoprene rubber, styrene-butadiene rubber and butadiene rubber,
a weight ratio of said component (A-2) to said component (B) ((A-2)/(B)) being in the range of 1/99 to 99/1;

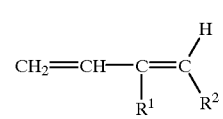

(I)

wherein $R^1$ is hydrogen atom or methyl and $R^2$ is a hydrogen atom, wherein the unsaturated olefin copolymer (A-2) has a molar ratio of constituent units derived from ethylene to constituent units derived from propylene (ethylene/propylene) ranging from 99/1 to 40/60, has a molar ratio of the total of constituent units derived from ethylene and constituent units derived from propylene to constituent units derived from styrene (ethylene+propylene/styrene) ranging from 99.5/0.5 to 50/50, and (A-2) has an intrinsic viscosity (η), as measured in decalin at 135° C., of 0.1 to 10 dl/g, and (A-2) has an iodine value of 1 to 50.

51. The unsaturated elastomer composition as claimed in claim 1 comprising:
(A-1) an unsaturated olefin copolymer of at least on alpha-olefin of 2 to 20 carbon atoms selected from the group consisting of ethylene, propylene, 1-butene, 1-pentene, 1-hexene, 3-methyl-1-butene, 3-methyl-1-pentene, 3-ethyl-1-pentene, 4-methyl-1 -pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12-ethyl-1-tetradecene, and a conjugated diene monomer represented by the following formula (I), and
(B) a diene rubber,
a weight ratio of said component (A-1) to said component (B) ((A-1)/(B)) being in the range of 1/99 to 99/1;

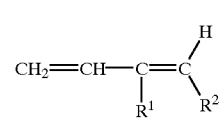

(I)

wherein $R^1$ and $R^2$ are each independently a hydrogen atom, an alkyl group of 1 to 8 carbon atoms or an aryl group, and at least one of $R^1$ and $R^2$ is a hydrogen atom.

52. The unsaturated elastomer composition as claimed in claim 1 comprising:

(A-1) an unsaturated olefin copolymer of ethylene, at least one alpha-olefin selected from the group consisting of propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12 ethyl-1-tetradecene, and a conjugated diene monomer represented by the following formula (I), wherein the molar ratio of the constituent units derived from ethylene to the constituent units derived from the alpha-olefin (ethylene/alpha-olefin) is in the range of 99/1 to 40/60, and (B) an ethylene/alpha-olefin/nonconjugated polyene copolymer rubber, a weight ratio of said component (A-1) to said component (B) ((A-1)/(B)) being in the range of 1/99 to 99/1;

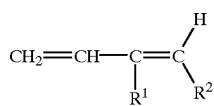
(I)

wherein $R^1$ and $R^2$ are each independently a hydrogen atom, an alkyl group of 1 to 8 carbon atoms or an aryl group, and at least one of $R^1$ and $R^2$ is a hydrogen atom.

53. An unsaturated elastomer composition comprising:

(A-1) an unsaturated olefin copolymer of at least one alpha-olefin of 2 to 20 carbon atoms and a conjugated diene monomer represented by the following formula (I), and (B) at least one rubber selected from a diene rubber and an ethylene/alpha-olefin/nonconjugated polyene copolymer rubber, wherein the diene rubber is nitrile rubber and/or hydrogenated nitrile rubber, a weight ratio of said component (A-1) to said component (B) ((A-1)/(B)) being in the range of 1/99 to 99/1;

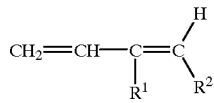
(I)

wherein $R^1$ and $R^2$ are each independently a hydrogen atom, an alkyl group of 1 to 8 carbon atoms or an aryl group, and at least one of $R^1$ and $R^2$ is a hydrogen atom.

54. An unsaturated elastomer composition comprising:

(A-1) an unsaturated olefin copolymer of ethylene, alpha-olefin of 3 to 20 carbon atoms and a conjugated diene monomer represented by the following formula (I), and (B) at least one rubber selected from a diene rubber and an ethylene/alpha-olefin/nonconjugated polyene copolymer rubber, wherein the diene rubber is nitrile rubber and/or hydrogenated nitrile rubber, a weight ratio of said component (A-1) to said component (B) ((A-1)/(B)) being in the range of 1/99 to 99/1;

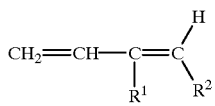
(I)

wherein $R^1$ and $R^2$ are each independently a hydrogen atom, an alkyl group of 1 to 8 carbon atoms or an aryl group, and at least one of $R^1$ and $R^2$ is a hydrogen atom.

55. An unsaturated elastomer composition comprising:

(A-1) an unsaturated olefin copolymer of ethylene, alpha-olefin of 3 to 20 carbon atoms and a conjugated diene monomer represented by the following formula (I), and (B) at least one rubber selected from a diene rubber and an ethylene/alpha-olefin/nonconjugated polyene copolymer rubber having an intrinsic viscosity (η), as measured in decalin at 135° C., of 0.8 to 5.0 dl/g, a weight ratio of said component (A-1) to said component (B) ((A-1)/(B)) being in the range of 1/99 to 99/1;

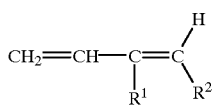
(I)

wherein $R^1$ and $R^2$ are each independently a hydrogen atom, an alkyl group of 1 to 8 carbon atoms or an aryl group, and at least one of $R^1$ and $R^2$ is a hydrogen atom, wherein the unsaturated olefin copolymer (A-1) has a molar ratio of constituent units derived from ethylene to constituent units derived from the α-olefin of 3 to 20 carbon atoms (ethylene/alpha-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five membered rings) is in the range of 20/80 to 90/10, and the content of the constituent units derived from the conjugated diene monomer is in the range of 0.01 to 30% by mol.

56. An unsaturated elastomer composition comprising:

(A-1) an unsaturated olefin copolymer of ethylene, alpha-olefin of 3 to 20 carbon atoms and a conjugated diene monomer represented by the following formula (I) having an intrinsic viscosity (η), as measured in decalin at 135° C. of 0.1 to 10 dl/g, and (B) at least one rubber selected from a diene rubber and an ethylene/alpha-olefin/nonconjugated polyene copolymer rubber, a weight ratio of said component (A-1) to said component (B) ((A-1)/(B)) being in the range of 1/99 to 99/1;

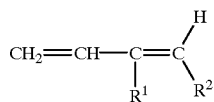 (I)

wherein $R^1$ and $R^2$ are each independently a hydrogen atom, an alkyl group of 1 to 8 carbon atoms or an aryl group, and at least one of $R^1$ and $R^2$ is a hydrogen atom, wherein the unsaturated olefin copolymer (A-1) has a molar ratio of constituent units derived from ethylene to constituent units derived from the alpha-olefin of 3 to 20 carbon atoms (ethylene/alpha-olefin) ranging from 99/1 to 40/60, and has the following properties:

(a) in said copolymer, 1,2-addition units (including 3,4-addition units) and 1,4-addition units derived from the conjugated diene monomer form double bonds in the side chain and the main chain of the copolymer, and the quantity ratio of the double bonds of the side chain derived from the 1,2-addition units (including 3,4-addition units) to the double bonds of the main chain derived from the 1,4-addition units (double bonds of side chain derived from 1,2-addition units (including 3,4-addition units)/double bonds of main chain derived from 1,4-addition units) is in the range of 5/95 to 99/1, (b) five-membered rings are present in the main chain of said copolymer, and (c) the quantity ratio of the double bonds from all of the addition units to the five-membered rings (total of double bonds from all addition units/five-membered rings) is in the range of 20/80 to 90/10, and the content of the constituent units derived from the conjugated diene monomer is in the range of 0.01 to 30% by mol.

* * * * *